US008941697B2

(12) United States Patent
Nathan et al.

(10) Patent No.: US 8,941,697 B2
(45) Date of Patent: *Jan. 27, 2015

(54) CIRCUIT AND METHOD FOR DRIVING AN ARRAY OF LIGHT EMITTING PIXELS

(71) Applicant: Ignis Innovation Inc., Waterloo (CA)

(72) Inventors: Arokia Nathan, Cambridge (GB); Yuriy Vygranenko, Waterloo (CA); Shahin Jafarabadiashtiani, Waterloo (CA); Peyman Servati, Vancouver (CA)

(73) Assignee: Ignis Innovation Inc., Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/046,480

(22) Filed: Oct. 4, 2013

(65) Prior Publication Data
US 2014/0028738 A1 Jan. 30, 2014

Related U.S. Application Data

(63) Continuation of application No. 13/113,651, filed on May 23, 2011, now Pat. No. 8,553,018, which is a continuation of application No. 10/554,754, filed as application No. PCT/CA2004/001742 on Sep. 23, 2004, now Pat. No. 7,978,187.

(30) Foreign Application Priority Data

Sep. 23, 2003 (CA) ..................... 2443206
Jun. 29, 2004 (CA) ..................... 2472689

(51) Int. Cl.
G09G 5/10 (2006.01)
H05B 37/02 (2006.01)
G09G 3/32 (2006.01)

(52) U.S. Cl.
CPC .......... *H05B 37/0209* (2013.01); *G09G 3/3241* (2013.01); *G09G 2300/0417* (2013.01); *G09G 2300/0842* (2013.01)

USPC .......................................... 345/690; 345/691

(58) Field of Classification Search
CPC ............... G09G 3/3241; G09G 3/325; G09G 2300/0417; G09G 2300/0842
USPC ...................... 345/76–84, 204–211; 370/354; 347/235; 315/169.3, 307, 291
See application file for complete search history.

(56) References Cited

U.S. PATENT DOCUMENTS 3,506,851 A     4/1970  Polkinghorn et al.
3,581,065 A  *  5/1971  Hatsukano et al. ............. 377/37

(Continued)

FOREIGN PATENT DOCUMENTS

CA    1 294 034     1/1992
CA    2 109 951    11/1992

(Continued)

OTHER PUBLICATIONS

Ahnood et al.: "Effect of threshold voltage instability on field effect mobility in thin film transistors deduced from constant current measurements"; dated Aug. 2009.

(Continued)

*Primary Examiner* — Prabodh M Dharia
(74) *Attorney, Agent, or Firm* — Nixon Peabody LLP

(57) ABSTRACT

A technique for driving a column of pixels that include light emitting elements. The technique incorporates feedback data provided from feedback data sources connected to the data line and to feedback line of the array, pixel driving circuit with feedback path. The technique can also include block of the reference elements for input signal corrections.

23 Claims, 10 Drawing Sheets

(56) References Cited

U.S. PATENT DOCUMENTS

| | | | |
|---|---|---|---|
| 3,774,055 A | 11/1973 | Bapat et al. | |
| 3,909,674 A * | 9/1975 | Spence et al. | 361/56 |
| 4,090,096 A | 5/1978 | Nagami | |
| 4,122,361 A * | 10/1978 | Clemen et al. | 327/250 |
| 4,160,934 A * | 7/1979 | Kirsch | 315/307 |
| 4,943,956 A | 7/1990 | Noro | |
| 4,996,523 A | 2/1991 | Bell et al. | |
| 5,153,420 A | 10/1992 | Hack et al. | |
| 5,198,803 A | 3/1993 | Shie et al. | |
| 5,204,661 A | 4/1993 | Hack et al. | |
| 5,266,515 A | 11/1993 | Robb et al. | |
| 5,329,312 A * | 7/1994 | Boisvert et al. | 348/256 |
| 5,489,918 A | 2/1996 | Mosier | |
| 5,498,880 A | 3/1996 | Lee et al. | |
| 5,561,354 A * | 10/1996 | Simons et al. | 315/408 |
| 5,572,444 A | 11/1996 | Lentz et al. | |
| 5,589,847 A | 12/1996 | Lewis | |
| 5,619,033 A | 4/1997 | Weisfield | |
| 5,648,276 A | 7/1997 | Hara et al. | |
| 5,670,973 A | 9/1997 | Bassetti et al. | |
| 5,691,783 A | 11/1997 | Numao et al. | |
| 5,714,968 A | 2/1998 | Ikeda | |
| 5,723,950 A | 3/1998 | Wei et al. | |
| 5,744,824 A | 4/1998 | Kousai et al. | |
| 5,745,660 A | 4/1998 | Kolpatzik et al. | |
| 5,748,160 A | 5/1998 | Shieh et al. | |
| 5,815,303 A | 9/1998 | Berlin | |
| 5,831,657 A * | 11/1998 | Sakaue et al. | 347/131 |
| 5,870,071 A | 2/1999 | Kawahata | |
| 5,874,803 A | 2/1999 | Garbuzov et al. | |
| 5,880,582 A | 3/1999 | Sawada | |
| 5,903,248 A | 5/1999 | Irwin | |
| 5,917,280 A | 6/1999 | Burrows et al. | |
| 5,923,794 A | 7/1999 | McGrath et al. | |
| 5,945,972 A | 8/1999 | Okumura et al. | |
| 5,949,398 A | 9/1999 | Kim | |
| 5,952,789 A | 9/1999 | Stewart et al. | |
| 5,952,991 A | 9/1999 | Akiyama et al. | |
| 5,982,104 A | 11/1999 | Sasaki et al. | |
| 5,990,629 A | 11/1999 | Yamada et al. | |
| 6,023,259 A | 2/2000 | Howard et al. | |
| 6,069,365 A | 5/2000 | Chow et al. | |
| 6,091,203 A | 7/2000 | Kawashima et al. | |
| 6,097,360 A * | 8/2000 | Holloman | 345/84 |
| 6,144,222 A | 11/2000 | Ho | |
| 6,148,949 A * | 11/2000 | Kobayashi et al. | 180/446 |
| 6,177,915 B1 | 1/2001 | Beeteson et al. | |
| 6,229,506 B1 | 5/2001 | Dawson et al. | |
| 6,229,508 B1 | 5/2001 | Kane | |
| 6,246,180 B1 | 6/2001 | Nishigaki | |
| 6,252,248 B1 | 6/2001 | Sano et al. | |
| 6,259,424 B1 | 7/2001 | Kurogane | |
| 6,262,589 B1 | 7/2001 | Tamukai | |
| 6,262,704 B1 * | 7/2001 | Kurumisawa et al. | 345/98 |
| 6,271,825 B1 | 8/2001 | Greene et al. | |
| 6,288,696 B1 * | 9/2001 | Holloman | 345/84 |
| 6,304,039 B1 | 10/2001 | Appelberg et al. | |
| 6,307,322 B1 | 10/2001 | Dawson et al. | |
| 6,310,962 B1 | 10/2001 | Chung et al. | |
| 6,320,325 B1 | 11/2001 | Cok et al. | |
| 6,323,631 B1 | 11/2001 | Juang | |
| 6,351,078 B1 * | 2/2002 | Wang et al. | 315/169.3 |
| 6,356,029 B1 | 3/2002 | Hunter | |
| 6,373,454 B1 | 4/2002 | Knapp et al. | |
| 6,392,617 B1 | 5/2002 | Gleason | |
| 6,414,661 B1 | 7/2002 | Shen et al. | |
| 6,417,825 B1 | 7/2002 | Stewart et al. | |
| 6,433,488 B1 * | 8/2002 | Bu | 315/169.3 |
| 6,437,106 B1 | 8/2002 | Stoner et al. | |
| 6,441,560 B1 * | 8/2002 | Hunter | 315/169.1 |
| 6,445,369 B1 | 9/2002 | Yang et al. | |
| 6,448,953 B1 * | 9/2002 | Murade | 345/98 |
| 6,475,845 B2 | 11/2002 | Kimura | |
| 6,489,742 B2 * | 12/2002 | Lumsden | 318/727 |
| 6,496,174 B2 * | 12/2002 | Kurumisawa et al. | 345/98 |
| 6,501,098 B2 | 12/2002 | Yamazaki | |
| 6,501,466 B1 | 12/2002 | Yamagishi et al. | |
| 6,522,315 B2 | 2/2003 | Ozawa et al. | |
| 6,522,319 B1 * | 2/2003 | Yamazaki | 345/103 |
| 6,525,683 B1 | 2/2003 | Gu | |
| 6,531,827 B2 | 3/2003 | Kawashima | |
| 6,542,138 B1 | 4/2003 | Shannon et al. | |
| 6,552,745 B1 * | 4/2003 | Perner | 348/308 |
| 6,577,302 B2 * | 6/2003 | Hunter et al. | 345/204 |
| 6,580,408 B1 | 6/2003 | Bae et al. | |
| 6,580,454 B1 * | 6/2003 | Perner et al. | 348/302 |
| 6,580,657 B2 | 6/2003 | Sanford et al. | |
| 6,583,398 B2 | 6/2003 | Harkin | |
| 6,583,775 B1 | 6/2003 | Sekiya et al. | |
| 6,594,606 B2 | 7/2003 | Everitt | |
| 6,614,417 B2 * | 9/2003 | Murade | 345/98 |
| 6,618,030 B2 | 9/2003 | Kane et al. | |
| 6,636,206 B1 * | 10/2003 | Yatabe | 345/204 |
| 6,639,244 B1 | 10/2003 | Yamazaki et al. | |
| 6,668,645 B1 | 12/2003 | Gilmour et al. | |
| 6,677,713 B1 | 1/2004 | Sung | |
| 6,680,580 B1 | 1/2004 | Sung | |
| 6,687,266 B1 | 2/2004 | Ma et al. | |
| 6,690,000 B1 | 2/2004 | Muramatsu et al. | |
| 6,690,344 B1 | 2/2004 | Takeuchi et al. | |
| 6,693,388 B2 | 2/2004 | Oomura | |
| 6,693,610 B2 | 2/2004 | Shannon et al. | |
| 6,697,057 B2 | 2/2004 | Koyama et al. | |
| 6,720,942 B2 | 4/2004 | Lee et al. | |
| 6,724,151 B2 | 4/2004 | Yoo | |
| 6,734,636 B2 | 5/2004 | Sanford et al. | |
| 6,738,034 B2 | 5/2004 | Kaneko et al. | |
| 6,738,035 B1 | 5/2004 | Fan | |
| 6,753,655 B2 | 6/2004 | Shih et al. | |
| 6,753,834 B2 | 6/2004 | Mikami et al. | |
| 6,756,741 B2 | 6/2004 | Li | |
| 6,756,952 B1 | 6/2004 | Decaux et al. | |
| 6,756,958 B2 | 6/2004 | Furuhashi et al. | |
| 6,771,028 B1 | 8/2004 | Winters | |
| 6,777,712 B2 | 8/2004 | Sanford et al. | |
| 6,777,888 B2 | 8/2004 | Kondo | |
| 6,781,567 B2 | 8/2004 | Kimura | |
| 6,806,497 B2 | 10/2004 | Jo | |
| 6,806,638 B2 | 10/2004 | Lin et al. | |
| 6,806,857 B2 | 10/2004 | Sempel et al. | |
| 6,809,706 B2 | 10/2004 | Shimoda | |
| 6,815,975 B2 | 11/2004 | Nara et al. | |
| 6,828,950 B2 | 12/2004 | Koyama | |
| 6,853,371 B2 | 2/2005 | Miyajima et al. | |
| 6,859,193 B1 | 2/2005 | Yumoto | |
| 6,873,117 B2 | 3/2005 | Ishizuka | |
| 6,876,346 B2 | 4/2005 | Anzai et al. | |
| 6,885,356 B2 | 4/2005 | Hashimoto | |
| 6,900,485 B2 | 5/2005 | Lee | |
| 6,900,788 B2 * | 5/2005 | Yamazaki | 345/103 |
| 6,903,734 B2 | 6/2005 | Eu | |
| 6,909,243 B2 | 6/2005 | Inukai | |
| 6,909,419 B2 | 6/2005 | Zavracky et al. | |
| 6,911,960 B1 | 6/2005 | Yokoyama | |
| 6,911,964 B2 | 6/2005 | Lee et al. | |
| 6,914,448 B2 | 7/2005 | Jinno | |
| 6,919,871 B2 | 7/2005 | Kwon | |
| 6,924,602 B2 | 8/2005 | Komiya | |
| 6,937,215 B2 | 8/2005 | Lo | |
| 6,937,220 B2 | 8/2005 | Kitaura et al. | |
| 6,940,214 B1 | 9/2005 | Komiya et al. | |
| 6,943,500 B2 | 9/2005 | LeChevalier | |
| 6,947,022 B2 | 9/2005 | McCartney | |
| 6,954,194 B2 | 10/2005 | Matsumoto et al. | |
| 6,956,547 B2 | 10/2005 | Bae et al. | |
| 6,975,142 B2 | 12/2005 | Azami et al. | |
| 6,975,332 B2 | 12/2005 | Arnold et al. | |
| 6,995,510 B2 | 2/2006 | Murakami et al. | |
| 6,995,519 B2 | 2/2006 | Arnold et al. | |
| 7,016,538 B2 * | 3/2006 | Kawakami et al. | 382/203 |
| 7,023,408 B2 | 4/2006 | Chen et al. | |
| 7,027,015 B2 | 4/2006 | Booth, Jr. et al. | |
| 7,027,078 B2 | 4/2006 | Reihl | |
| 7,034,793 B2 | 4/2006 | Sekiya et al. | |

(56) References Cited

U.S. PATENT DOCUMENTS

| | | |
|---|---|---|
| 7,038,392 B2 | 5/2006 | Libsch et al. |
| 7,057,359 B2 * | 6/2006 | Hung et al. .................. 315/291 |
| 7,061,451 B2 | 6/2006 | Kimura |
| 7,064,733 B2 | 6/2006 | Cok et al. |
| 7,071,932 B2 | 7/2006 | Libsch et al. |
| 7,088,051 B1 | 8/2006 | Cok |
| 7,088,052 B2 | 8/2006 | Kimura |
| 7,102,378 B2 | 9/2006 | Kuo et al. |
| 7,106,285 B2 | 9/2006 | Naugler |
| 7,112,820 B2 | 9/2006 | Change et al. |
| 7,116,058 B2 | 10/2006 | Lo et al. |
| 7,119,493 B2 | 10/2006 | Fryer et al. |
| 7,122,835 B1 | 10/2006 | Ikeda et al. |
| 7,127,380 B1 | 10/2006 | Iverson et al. |
| 7,129,914 B2 | 10/2006 | Knapp et al. |
| 7,164,417 B2 | 1/2007 | Cok |
| 7,193,589 B2 | 3/2007 | Yoshida et al. |
| 7,224,332 B2 | 5/2007 | Cok |
| 7,227,519 B1 | 6/2007 | Kawase et al. |
| 7,245,277 B2 | 7/2007 | Ishizuka |
| 7,248,236 B2 | 7/2007 | Nathan et al. |
| 7,262,753 B2 | 8/2007 | Tanghe et al. |
| 7,271,785 B2 * | 9/2007 | Jang .............................. 345/80 |
| 7,274,363 B2 | 9/2007 | Ishizuka et al. |
| 7,310,092 B2 | 12/2007 | Imamura |
| 7,315,295 B2 | 1/2008 | Kimura |
| 7,321,348 B2 | 1/2008 | Cok et al. |
| 7,339,560 B2 | 3/2008 | Sun |
| 7,355,574 B1 | 4/2008 | Leon et al. |
| 7,358,941 B2 | 4/2008 | Ono et al. |
| 7,368,868 B2 | 5/2008 | Sakamoto |
| 7,411,571 B2 | 8/2008 | Huh |
| 7,414,600 B2 | 8/2008 | Nathan et al. |
| 7,423,617 B2 | 9/2008 | Giraldo et al. |
| 7,474,285 B2 | 1/2009 | Kimura |
| 7,502,000 B2 | 3/2009 | Yuki et al. |
| 7,528,812 B2 | 5/2009 | Tsuge et al. |
| 7,535,449 B2 | 5/2009 | Miyazawa |
| 7,554,512 B2 | 6/2009 | Steer |
| 7,569,849 B2 | 8/2009 | Nathan et al. |
| 7,576,718 B2 | 8/2009 | Miyazawa |
| 7,580,012 B2 | 8/2009 | Kim et al. |
| 7,589,707 B2 | 9/2009 | Chou |
| 7,609,239 B2 | 10/2009 | Chang |
| 7,619,594 B2 | 11/2009 | Hu |
| 7,619,597 B2 | 11/2009 | Nathan et al. |
| 7,633,470 B2 * | 12/2009 | Kane .............................. 345/82 |
| 7,656,370 B2 | 2/2010 | Schneider et al. |
| 7,800,558 B2 * | 9/2010 | Routley et al. .................. 345/77 |
| 7,847,764 B2 | 12/2010 | Cok et al. |
| 7,859,492 B2 | 12/2010 | Kohno |
| 7,868,859 B2 | 1/2011 | Tomida et al. |
| 7,876,294 B2 | 1/2011 | Sasaki et al. |
| 7,924,249 B2 | 4/2011 | Nathan et al. |
| 7,932,883 B2 | 4/2011 | Klompenhouwer et al. |
| 7,969,390 B2 | 6/2011 | Yoshida |
| 7,978,187 B2 | 7/2011 | Nathan et al. |
| 7,994,712 B2 | 8/2011 | Sung et al. |
| 8,026,876 B2 | 9/2011 | Nathan et al. |
| 8,049,420 B2 | 11/2011 | Tamura et al. |
| 8,077,123 B2 | 12/2011 | Naugler, Jr. |
| 8,115,707 B2 | 2/2012 | Nathan et al. |
| 8,223,177 B2 | 7/2012 | Nathan et al. |
| 8,232,939 B2 | 7/2012 | Nathan et al. |
| 8,259,044 B2 | 9/2012 | Nathan et al. |
| 8,264,431 B2 | 9/2012 | Bulovic et al. |
| 8,279,143 B2 | 10/2012 | Nathan et al. |
| 8,339,386 B2 | 12/2012 | Leon et al. |
| 2001/0002703 A1 | 6/2001 | Koyama |
| 2001/0009283 A1 | 7/2001 | Arao et al. |
| 2001/0024181 A1 | 9/2001 | Kubota |
| 2001/0024186 A1 | 9/2001 | Kane et al. |
| 2001/0026257 A1 | 10/2001 | Kimura |
| 2001/0030323 A1 | 10/2001 | Ikeda |
| 2001/0040541 A1 | 11/2001 | Yoneda et al. |
| 2001/0043173 A1 | 11/2001 | Troutman |
| 2001/0045929 A1 | 11/2001 | Prache |
| 2001/0052606 A1 | 12/2001 | Sempel et al. |
| 2001/0052940 A1 | 12/2001 | Hagihara et al. |
| 2002/0000576 A1 | 1/2002 | Inukai |
| 2002/0011796 A1 | 1/2002 | Koyama |
| 2002/0011799 A1 | 1/2002 | Kimura |
| 2002/0012057 A1 | 1/2002 | Kimura |
| 2002/0014851 A1 | 2/2002 | Tai et al. |
| 2002/0018034 A1 | 2/2002 | Ohki et al. |
| 2002/0030190 A1 | 3/2002 | Ohtani et al. |
| 2002/0047565 A1 | 4/2002 | Nara et al. |
| 2002/0052086 A1 | 5/2002 | Maeda |
| 2002/0067134 A1 | 6/2002 | Kawashima |
| 2002/0084463 A1 | 7/2002 | Sanford et al. |
| 2002/0101172 A1 | 8/2002 | Bu |
| 2002/0105279 A1 | 8/2002 | Kimura |
| 2002/0117722 A1 | 8/2002 | Osada et al. |
| 2002/0122308 A1 | 9/2002 | Ikeda |
| 2002/0158587 A1 | 10/2002 | Komiya |
| 2002/0158666 A1 | 10/2002 | Azami et al. |
| 2002/0158823 A1 | 10/2002 | Zavracky et al. |
| 2002/0167474 A1 | 11/2002 | Everitt |
| 2002/0180369 A1 | 12/2002 | Koyama |
| 2002/0180721 A1 | 12/2002 | Kimura et al. |
| 2002/0186214 A1 | 12/2002 | Siwinski |
| 2002/0190924 A1 | 12/2002 | Asano et al. |
| 2002/0190971 A1 | 12/2002 | Nakamura et al. |
| 2002/0195967 A1 | 12/2002 | Kim et al. |
| 2002/0195968 A1 | 12/2002 | Sanford et al. |
| 2003/0020413 A1 * | 1/2003 | Oomura ...................... 315/169.3 |
| 2003/0030603 A1 | 2/2003 | Shimoda |
| 2003/0043088 A1 | 3/2003 | Booth et al. |
| 2003/0057895 A1 | 3/2003 | Kimura |
| 2003/0058226 A1 | 3/2003 | Bertram et al. |
| 2003/0062524 A1 | 4/2003 | Kimura |
| 2003/0063081 A1 | 4/2003 | Kimura et al. |
| 2003/0071821 A1 | 4/2003 | Sundahl et al. |
| 2003/0076048 A1 | 4/2003 | Rutherford |
| 2003/0090447 A1 | 5/2003 | Kimura |
| 2003/0090481 A1 | 5/2003 | Kimura |
| 2003/0107560 A1 | 6/2003 | Yumoto et al. |
| 2003/0111966 A1 | 6/2003 | Mikami et al. |
| 2003/0122745 A1 | 7/2003 | Miyazawa |
| 2003/0122813 A1 | 7/2003 | Ishizuki et al. |
| 2003/0142088 A1 | 7/2003 | LeChevalier |
| 2003/0151569 A1 | 8/2003 | Lee et al. |
| 2003/0156101 A1 | 8/2003 | Le Chevalier |
| 2003/0174152 A1 | 9/2003 | Noguchi |
| 2003/0179626 A1 | 9/2003 | Sanford et al. |
| 2003/0197663 A1 | 10/2003 | Lee et al. |
| 2003/0210256 A1 | 11/2003 | Mori et al. |
| 2003/0230141 A1 | 12/2003 | Gilmour et al. |
| 2003/0230980 A1 | 12/2003 | Forrest et al. |
| 2003/0231148 A1 | 12/2003 | Lin et al. |
| 2003/0231152 A1 * | 12/2003 | Shin .............................. 345/83 |
| 2004/0032382 A1 | 2/2004 | Cok et al. |
| 2004/0066357 A1 | 4/2004 | Kawasaki |
| 2004/0070557 A1 | 4/2004 | Asano et al. |
| 2004/0070565 A1 | 4/2004 | Nayar et al. |
| 2004/0090186 A1 | 5/2004 | Yoshida et al. |
| 2004/0090400 A1 | 5/2004 | Yoo |
| 2004/0095297 A1 | 5/2004 | Libsch et al. |
| 2004/0100427 A1 | 5/2004 | Miyazawa |
| 2004/0108518 A1 | 6/2004 | Jo |
| 2004/0135749 A1 | 7/2004 | Kondakov et al. |
| 2004/0145547 A1 | 7/2004 | Oh |
| 2004/0150592 A1 | 8/2004 | Mizukoshi et al. |
| 2004/0150594 A1 | 8/2004 | Koyama et al. |
| 2004/0150595 A1 | 8/2004 | Kasai |
| 2004/0155841 A1 | 8/2004 | Kasai |
| 2004/0174347 A1 | 9/2004 | Sun et al. |
| 2004/0174354 A1 | 9/2004 | Ono et al. |
| 2004/0178743 A1 | 9/2004 | Miller et al. |
| 2004/0183759 A1 | 9/2004 | Stevenson et al. |
| 2004/0196275 A1 | 10/2004 | Hattori |
| 2004/0207615 A1 | 10/2004 | Yumoto |
| 2004/0239596 A1 | 12/2004 | Ono et al. |
| 2004/0252089 A1 | 12/2004 | Ono et al. |

(56) References Cited

U.S. PATENT DOCUMENTS

| | | |
|---|---|---|
| 2004/0257313 A1 | 12/2004 | Kawashima et al. |
| 2004/0257353 A1 | 12/2004 | Imamura et al. |
| 2004/0257355 A1 | 12/2004 | Naugler |
| 2004/0263437 A1 | 12/2004 | Hattori |
| 2004/0263444 A1 | 12/2004 | Kimura |
| 2004/0263445 A1 | 12/2004 | Inukai et al. |
| 2004/0263541 A1 | 12/2004 | Takeuchi et al. |
| 2005/0007355 A1* | 1/2005 | Miura .......................... 345/204 |
| 2005/0007357 A1 | 1/2005 | Yamashita et al. |
| 2005/0017650 A1 | 1/2005 | Fryer et al. |
| 2005/0024081 A1 | 2/2005 | Kuo et al. |
| 2005/0024393 A1 | 2/2005 | Kondo et al. |
| 2005/0030267 A1 | 2/2005 | Tanghe et al. |
| 2005/0057580 A1 | 3/2005 | Yamano et al. |
| 2005/0067970 A1 | 3/2005 | Libsch et al. |
| 2005/0067971 A1 | 3/2005 | Kane |
| 2005/0068270 A1 | 3/2005 | Awakura |
| 2005/0068275 A1 | 3/2005 | Kane |
| 2005/0073264 A1 | 4/2005 | Matsumoto |
| 2005/0083323 A1 | 4/2005 | Suzuki et al. |
| 2005/0088103 A1 | 4/2005 | Kageyama et al. |
| 2005/0110420 A1 | 5/2005 | Arnold et al. |
| 2005/0110807 A1 | 5/2005 | Chang |
| 2005/0140598 A1 | 6/2005 | Kim et al. |
| 2005/0140610 A1 | 6/2005 | Smith et al. |
| 2005/0145891 A1 | 7/2005 | Abe |
| 2005/0156831 A1 | 7/2005 | Yamazaki et al. |
| 2005/0168416 A1 | 8/2005 | Hashimoto et al. |
| 2005/0179626 A1 | 8/2005 | Yuki et al. |
| 2005/0179628 A1 | 8/2005 | Kimura |
| 2005/0185200 A1 | 8/2005 | Tobol |
| 2005/0200575 A1 | 9/2005 | Kim et al. |
| 2005/0206590 A1 | 9/2005 | Sasaki et al. |
| 2005/0219184 A1 | 10/2005 | Zehner et al. |
| 2005/0248515 A1 | 11/2005 | Naugler et al. |
| 2005/0269959 A1 | 12/2005 | Uchino et al. |
| 2005/0269960 A1 | 12/2005 | Ono et al. |
| 2005/0280615 A1 | 12/2005 | Cok et al. |
| 2005/0280766 A1 | 12/2005 | Johnson et al. |
| 2005/0285822 A1 | 12/2005 | Reddy et al. |
| 2005/0285825 A1 | 12/2005 | Eom et al. |
| 2006/0001613 A1* | 1/2006 | Routley et al. .................. 345/76 |
| 2006/0007072 A1 | 1/2006 | Choi et al. |
| 2006/0012310 A1 | 1/2006 | Chen et al. |
| 2006/0012311 A1 | 1/2006 | Ogawa |
| 2006/0027807 A1 | 2/2006 | Nathan et al. |
| 2006/0030084 A1 | 2/2006 | Young |
| 2006/0038762 A1 | 2/2006 | Chou |
| 2006/0066533 A1 | 3/2006 | Sato et al. |
| 2006/0066622 A1* | 3/2006 | Steer .............................. 345/504 |
| 2006/0077135 A1 | 4/2006 | Cok et al. |
| 2006/0082523 A1 | 4/2006 | Guo et al. |
| 2006/0092185 A1 | 5/2006 | Jo et al. |
| 2006/0097628 A1 | 5/2006 | Suh et al. |
| 2006/0097631 A1 | 5/2006 | Lee |
| 2006/0103611 A1 | 5/2006 | Choi |
| 2006/0149493 A1 | 7/2006 | Sambandan et al. |
| 2006/0170623 A1 | 8/2006 | Naugler, Jr. et al. |
| 2006/0176250 A1 | 8/2006 | Nathan et al. |
| 2006/0208961 A1 | 9/2006 | Nathan et al. |
| 2006/0232522 A1 | 10/2006 | Roy et al. |
| 2006/0244697 A1 | 11/2006 | Lee et al. |
| 2006/0261841 A1 | 11/2006 | Fish |
| 2006/0273997 A1 | 12/2006 | Nathan et al. |
| 2006/0284801 A1 | 12/2006 | Yoon et al. |
| 2006/0284895 A1 | 12/2006 | Marcu et al. |
| 2006/0290618 A1 | 12/2006 | Goto |
| 2007/0001937 A1 | 1/2007 | Park et al. |
| 2007/0001939 A1 | 1/2007 | Hashimoto et al. |
| 2007/0008268 A1 | 1/2007 | Park et al. |
| 2007/0008297 A1 | 1/2007 | Bassetti |
| 2007/0057873 A1 | 3/2007 | Uchino et al. |
| 2007/0069998 A1 | 3/2007 | Naugler et al. |
| 2007/0075727 A1 | 4/2007 | Nakano et al. |
| 2007/0076226 A1 | 4/2007 | Klompenhouwer et al. |
| 2007/0080905 A1 | 4/2007 | Takahara |
| 2007/0080906 A1 | 4/2007 | Tanabe |
| 2007/0080908 A1 | 4/2007 | Nathan et al. |
| 2007/0097038 A1 | 5/2007 | Yamazaki et al. |
| 2007/0097041 A1 | 5/2007 | Park et al. |
| 2007/0103419 A1 | 5/2007 | Uchino et al. |
| 2007/0115221 A1 | 5/2007 | Buchhauser et al. |
| 2007/0182671 A1 | 8/2007 | Nathan et al. |
| 2007/0236517 A1 | 10/2007 | Kimpe |
| 2007/0241999 A1 | 10/2007 | Lin |
| 2007/0273294 A1 | 11/2007 | Nagayama |
| 2007/0285359 A1 | 12/2007 | Ono |
| 2007/0290958 A1 | 12/2007 | Cok |
| 2007/0296672 A1 | 12/2007 | Kim et al. |
| 2008/0001525 A1 | 1/2008 | Chao et al. |
| 2008/0001544 A1 | 1/2008 | Murakami et al. |
| 2008/0036708 A1 | 2/2008 | Shirasaki |
| 2008/0042942 A1 | 2/2008 | Takahashi |
| 2008/0042948 A1 | 2/2008 | Yamashita et al. |
| 2008/0048951 A1 | 2/2008 | Naugler, Jr. et al. |
| 2008/0055209 A1 | 3/2008 | Cok |
| 2008/0074413 A1 | 3/2008 | Ogura |
| 2008/0088549 A1 | 4/2008 | Nathan et al. |
| 2008/0088648 A1 | 4/2008 | Nathan et al. |
| 2008/0117144 A1 | 5/2008 | Nakano et al. |
| 2008/0150847 A1 | 6/2008 | Kim et al. |
| 2008/0231558 A1 | 9/2008 | Naugler |
| 2008/0231562 A1 | 9/2008 | Kwon |
| 2008/0252571 A1 | 10/2008 | Hente et al. |
| 2008/0290805 A1 | 11/2008 | Yamada et al. |
| 2008/0297055 A1 | 12/2008 | Miyake et al. |
| 2009/0058772 A1 | 3/2009 | Lee |
| 2009/0160743 A1 | 6/2009 | Tomida et al. |
| 2009/0174628 A1 | 7/2009 | Wang et al. |
| 2009/0184901 A1 | 7/2009 | Kwon |
| 2009/0195483 A1 | 8/2009 | Naugler, Jr. et al. |
| 2009/0201281 A1 | 8/2009 | Routley et al. |
| 2009/0213046 A1 | 8/2009 | Nam |
| 2010/0004891 A1 | 1/2010 | Ahlers et al. |
| 2010/0026725 A1 | 2/2010 | Smith |
| 2010/0039422 A1 | 2/2010 | Seto |
| 2010/0060911 A1 | 3/2010 | Marcu et al. |
| 2010/0165002 A1 | 7/2010 | Ahn |
| 2010/0194670 A1 | 8/2010 | Cok |
| 2010/0207960 A1 | 8/2010 | Kimpe et al. |
| 2010/0277400 A1 | 11/2010 | Jeong |
| 2010/0315319 A1 | 12/2010 | Cok et al. |
| 2011/0069051 A1 | 3/2011 | Nakamura et al. |
| 2011/0069089 A1 | 3/2011 | Kopf et al. |
| 2011/0074750 A1 | 3/2011 | Leon et al. |
| 2011/0149166 A1 | 6/2011 | Botzas et al. |
| 2011/0227964 A1 | 9/2011 | Chaji et al. |
| 2011/0273399 A1 | 11/2011 | Lee |
| 2011/0293480 A1 | 12/2011 | Mueller |
| 2012/0056558 A1 | 3/2012 | Toshiya et al. |
| 2012/0062565 A1 | 3/2012 | Fuchs et al. |
| 2012/0299978 A1 | 11/2012 | Chaji |
| 2013/0027381 A1 | 1/2013 | Nathan et al. |
| 2013/0057595 A1 | 3/2013 | Nathan et al. |

FOREIGN PATENT DOCUMENTS

| | | |
|---|---|---|
| CA | 2 249 592 | 7/1998 |
| CA | 2 368 386 | 9/1999 |
| CA | 2 242 720 | 1/2000 |
| CA | 2 354 018 | 6/2000 |
| CA | 2 432 530 | 7/2002 |
| CA | 2 436 451 | 8/2002 |
| CA | 2 438 577 | 8/2002 |
| CA | 2 463 653 | 1/2004 |
| CA | 2 498 136 | 3/2004 |
| CA | 2 522 396 | 11/2004 |
| CA | 2 443 206 | 3/2005 |
| CA | 2 472 671 | 12/2005 |
| CA | 2 567 076 | 1/2006 |
| CA | 2 526 782 | 4/2006 |
| CA | 2 550 102 | 4/2008 |
| CN | 1381032 | 11/2002 |
| CN | 1448908 | 10/2003 |

(56) References Cited

FOREIGN PATENT DOCUMENTS

| CN | 1760945 | 4/2006 |
|---|---|---|
| EP | 0 158 366 | 10/1985 |
| EP | 1 028 471 | 8/2000 |
| EP | 1 111 577 | 6/2001 |
| EP | 1 130 565 A1 | 9/2001 |
| EP | 1 194 013 | 4/2002 |
| EP | 1 335 430 A1 | 8/2003 |
| EP | 1 372 136 | 12/2003 |
| EP | 1 381 019 | 1/2004 |
| EP | 1 418 566 | 5/2004 |
| EP | 1 429 312 A | 6/2004 |
| EP | 1 465 143 A | 10/2004 |
| EP | 1 469 448 A | 10/2004 |
| EP | 1 521 203 A2 | 4/2005 |
| EP | 1 594 347 | 11/2005 |
| EP | 1 784 055 A2 | 5/2007 |
| EP | 1854338 A1 | 11/2007 |
| EP | 1 879 169 A1 | 1/2008 |
| EP | 1 879 172 | 1/2008 |
| GB | 2 389 951 | 12/2003 |
| JP | 1272298 | 10/1989 |
| JP | 4-042619 | 2/1992 |
| JP | 6-314977 | 11/1994 |
| JP | 8-340243 | 12/1996 |
| JP | 09-090405 | 4/1997 |
| JP | 10-254410 | 9/1998 |
| JP | 11-202295 | 7/1999 |
| JP | 11-219146 | 8/1999 |
| JP | 11 231805 | 8/1999 |
| JP | 11-282419 | 10/1999 |
| JP | 2000-056847 | 2/2000 |
| JP | 2000-81607 | 3/2000 |
| JP | 2001-134217 | 5/2001 |
| JP | 2001-195014 | 7/2001 |
| JP | 2002-055654 | 2/2002 |
| JP | 2002-91376 | 3/2002 |
| JP | 2002-514320 | 5/2002 |
| JP | 2002-278513 | 9/2002 |
| JP | 2002-333862 | 11/2002 |
| JP | 2003-076331 | 3/2003 |
| JP | 2003-124519 | 4/2003 |
| JP | 2003-177709 | 6/2003 |
| JP | 2003-271095 | 9/2003 |
| JP | 2003-308046 | 10/2003 |
| JP | 2003-317944 | 11/2003 |
| JP | 2004-145197 | 5/2004 |
| JP | 2004-287345 | 10/2004 |
| JP | 2005-057217 | 3/2005 |
| JP | 4-158570 | 10/2008 |
| KR | 2004-0100887 | 12/2004 |
| TW | 342486 | 10/1998 |
| TW | 473622 | 1/2002 |
| TW | 485337 | 5/2002 |
| TW | 502233 | 9/2002 |
| TW | 538650 | 6/2003 |
| TW | 1221268 | 9/2004 |
| TW | 1223092 | 11/2004 |
| TW | 200727247 | 7/2007 |
| WO | WO 98/48403 | 10/1998 |
| WO | WO 99/48079 | 9/1999 |
| WO | WO 01/06484 | 1/2001 |
| WO | WO 01/27910 A1 | 4/2001 |
| WO | WO 01/63587 A2 | 8/2001 |
| WO | WO 02/067327 A | 8/2002 |
| WO | WO 03/001496 A1 | 1/2003 |
| WO | WO 03/034389 A | 4/2003 |
| WO | WO 03/058594 A1 | 7/2003 |
| WO | WO 03-063124 | 7/2003 |
| WO | WO 03/077231 | 9/2003 |
| WO | WO 2004/003877 | 1/2004 |
| WO | WO 2004/025615 A | 3/2004 |
| WO | WO 2004/034364 | 4/2004 |
| WO | WO 2004/047058 | 6/2004 |
| WO | WO 2004/104975 A1 | 12/2004 |
| WO | WO 2005/022498 | 3/2005 |
| WO | WO 2005/022500 A | 3/2005 |
| WO | WO 2005/029455 | 3/2005 |
| WO | WO 2005/029456 | 3/2005 |
| WO | WO 2005/055185 | 6/2005 |
| WO | WO 2006/000101 A1 | 1/2006 |
| WO | WO 2006/053424 | 5/2006 |
| WO | WO 2006/063448 A | 6/2006 |
| WO | WO 2006/084360 | 8/2006 |
| WO | WO 2007/003877 A | 1/2007 |
| WO | WO 2007/079572 | 7/2007 |
| WO | WO 2007/120849 A2 | 10/2007 |
| WO | WO 2009/055920 | 5/2009 |
| WO | WO 2010/023270 | 3/2010 |
| WO | WO 2011/041224 A1 | 4/2011 |

OTHER PUBLICATIONS

Alexander et al.: "Pixel circuits and drive schemes for glass and elastic AMOLED displays"; dated Jul. 2005 (9 pages).

Alexander et al.: "Unique Electrical Measurement Technology for Compensation, Inspection, and Process Diagnostics of AMOLED HDTV"; dated May 2010 (4 pages).

Ashtiani et al.: "AMOLED Pixel Circuit With Electronic Compensation of Luminance Degradation"; dated Mar. 2007 (4 pages).

Chaji et al.: "A Current-Mode Comparator for Digital Calibration of Amorphous Silicon AMOLED Displays"; dated Jul. 2008 (5 pages).

Chaji et al.: "A fast settling current driver based on the CCII for AMOLED displays"; dated Dec. 2009 (6 pages).

Chaji et al.: "A Low-Cost Stable Amorphous Silicon AMOLED Display with Full V~T- and V~O~L~E~D Shift Compensation"; dated May 2007 (4 pages).

Chaji et al.: "A low-power driving scheme for a-Si:H active-matrix organic light-emitting diode displays"; dated Jun. 2005 (4 pages).

Chaji et al.: "A low-power high-performance digital circuit for deep submicron technologies"; dated Jun. 2005 (4 pages).

Chaji et al.: "A novel a-Si:H AMOLED pixel circuit based on short-term stress stability of a-Si:H TFTs"; dated Oct. 2005 (3 pages).

Chaji et al.: "A Novel Driving Scheme and Pixel Circuit for AMOLED Displays"; dated Jun. 2006 (4 pages).

Chaji et al.: "A Novel Driving Scheme for High Resolution Large-area a-Si:H AMOLED displays"; dated Aug. 2005 (3 pages).

Chaji et al.: "A Stable Voltage-Programmed Pixel Circuit for a-Si:H AMOLED Displays"; dated Dec. 2006 (12 pages).

Chaji et al.: "A Sub-µA fast-settling current-programmed pixel circuit for AMOLED displays"; dated Sep. 2007.

Chaji et al.: "An Enhanced and Simplified Optical Feedback Pixel Circuit for AMOLED Displays"; dated Oct. 2006.

Chaji et al.: "Compensation technique for DC and transient instability of thin film transistor circuits for large-area devices"; dated Aug. 2008.

Chaji et al.: "Driving scheme for stable operation of 2-TFT a-Si AMOLED pixel"; dated Apr. 2005 (2 pages).

Chaji et al.: "Dynamic-effect compensating technique for stable a-Si:H AMOLED displays"; dated Aug. 2005 (4 pages).

Chaji et al.: "Electrical Compensation of OLED Luminance Degradation"; dated Dec. 2007 (3 pages).

Chaji et al.: "eUTDSP: a design study of a new VLIW-based DSP architecture"; dated My 2003 (4 pages).

Chaji et al.: "Fast and Offset-Leakage Insensitive Current-Mode Line Driver for Active Matrix Displays and Sensors"; dated Feb. 2009 (8 pages).

Chaji et al.: "High Speed Low Power Adder Design With a New Logic Style: Pseudo Dynamic Logic (SDL)"; dated Oct. 2001 (4 pages).

Chaji et al.: "High-precision, fast current source for large-area current-programmed a-Si flat panels"; dated Sep. 2006 (4 pages).

Chaji et al.: "Low-Cost AMOLED Television with IGNIS Compensating Technology"; dated May 2008 (4 pages).

Chaji et al.: "Low-Cost Stable a-Si:H AMOLED Display for Portable Applications"; dated Jun. 2006 (4 pages).

Chaji et al.: "Low-Power Low-Cost Voltage-Programmed a-Si:H AMOLED Display"; dated Jun. 2008 (5 pages).

(56) References Cited

OTHER PUBLICATIONS

Chaji et al.: "Merged phototransistor pixel with enhanced near infrared response and flicker noise reduction for biomolecular imaging"; dated Nov. 2008 (3 pages).
Chaji et al.: "Parallel Addressing Scheme for Voltage-Programmed Active-Matrix OLED Displays"; dated May 2007 (6 pages).
Chaji et al.: "Pseudo dynamic logic (SDL): a high-speed and low-power dynamic logic family"; dated 2002 (4 pages).
Chaji et al.: "Stable a-Si:H circuits based on short-term stress stability of amorphous silicon thin film transistors"; dated May 2006 (4 pages).
Chaji et al.: "Stable Pixel Circuit for Small-Area High-Resolution a-Si:H AMOLED Displays"; dated Oct. 2008 (6 pages).
Chaji et al.: "Stable RGBW AMOLED display with OLED degradation compensation using electrical feedback"; dated Feb. 2010 (2 pages).
Chaji et al.: "Thin-Film Transistor Integration for Biomedical Imaging and AMOLED Displays"; dated 2008 (177 pages).
European Search Report for EP Application No. EP 10166143, dated Sep. 3, 2010 (2 pages).
European Search Report for European Application No. EP 11739485.8-1904 dated Aug. 6, 2013, (14 pages).
European Search Report for European Application No. EP 011122313 dated Sep. 14, 2005 (4 pages).
European Search Report for European Application No. EP 04786661 dated Mar. 9, 2009.
European Search Report for European Application No. EP 05759141 dated Oct. 30, 2009 (2 pages).
European Search Report for European Application No. EP 05819617 dated Jan. 30, 2009.
European Search Report for European Application No. EP 06 70 5133 dated Jul. 18, 2008.
European Search Report for European Application No. EP 06721798 dated Nov. 12, 2009 (2 pages).
European Search Report for European Application No. EP 07719579 dated May 20, 2009.
European Search Report for European Application No. EP 07815784 dated Jul. 20, 2010 (2 pages).
European Search Report for European Application No. EP 07710608.6 dated Mar. 19, 2010 (7 pages).
European Search Report, Application No. EP 10834294.0-1903, dated Apr. 8, 2013, (9 pages).
European Supplementary Search Report corresponding to European Application No. EP 04786662 dated Jan. 19, 2007 (2 pages).
Extended European Search Report mailed Apr. 27, 2011 issued during prosecution of European patent application No. EP 09733076.5 (13 pages).
Extended European Search Report mailed Jul. 11, 2012 which issued in corresponding European Patent Application No. EP 11191641.7 (14 pages).
Extended European Search Report mailed Nov. 29, 2012, issued in European Patent Application No. EP 11168677.0 (13 page).
Fossum, Eric R.. "Active Pixel Sensors: Are CCD's Dinosaurs?" SPIE: Symposium on Electronic Imaging. Feb. 1, 1993 (13 pages).
International Preliminary Report on Patentability for International Application No. PCT/CA2005/001007 dated Oct. 16, 2006, 4 pages.
International Search Report corresponding to International Application No. PCT/IB2011/050502, dated Jun. 27, 2011 (6 pages).
International Search Report corresponding to International Application No. PCT/CA2004/001742, Canadian Patent Office, dated Feb. 21, 2005 (2 pages).
International Search Report corresponding to International Application No. PCT/IB2010/055541 filed Dec. 1, 2010, dated May 26, 2011; 5 pages.
International Search Report corresponding to International Application No. PCT/IB2011/055135, Canadian Patent Office, dated Apr. 16, 2012 (5 pages).
International Search Report for Application No. PCT/IB2010/055486, Dated Apr. 19, 2011, 5 pages.
International Search Report for International Application No. PCT/CA2005/001007 dated Oct. 18, 2005.
International Search Report for International Application No. PCT/CA2007/000652 dated Jul. 25, 2007.
European Search Report for European Application No. PCT/CA2006/000177 dated Jun. 2, 2006.
International Search Report for International Application No. PCT/CA2004/001741 dated Feb. 21, 2005.
International Search Report for PCT Application No. PCT/CA2009/001769, dated Apr. 8, 2010 (3 pages).
International Search Report mailed Dec. 3, 2002, issued in International Patent Application No. PCT/JP02/09668 (4 pages).
International Search Report mailed Jul. 30, 2009 for International Application No. PCT/CA2009/000501 (4 pages).
International Search Report mailed Mar. 21, 2006 issued in International Patent Application No. PCT/CA2005/001897 (2 pages).
International Search Report, PCT/IB2012/052372, mailed Sep. 12, 2012 (3 pages).
International Searching Authority Search Report, PCT/IB2010/055481, dated Apr. 7, 2011, 3 pages.
International Searching Authority Search Report, PCT/IB2011/051103, dated Jul. 8, 2011, 3 pages.
International Searching Authority Written Opinion, PCT/IB2010/055481, dated Apr. 7, 2011, 6 pages.
International Searching Authority Written Opinion, PCT/IB2011/051103, dated Jul. 8, 2011, 6 pages.
International Written Opinion corresponding to International Application No. PCT/CA2004/001742, Canadian Patent Office, dated Feb. 21, 2005 (5 pages).
International Written Opinion corresponding to International Application No. PCT/IB2011/055135, Canadian Patent Office, dated Apr. 16, 2012 (5 pages).
International Written Opinion for Application No. PCT/IB2010/055486, Dated Apr. 19, 2011, 8 pages.
International Written Opinion for International Application No. PCT/CA2009/000501 mailed Jul. 30, 2009 (6 pages).
International Written Opinion mailed Mar. 21, 2006 corresponding to International Patent Application No. PCT/CA2005/001897 (4 pages).
International Written Opinion of the International Searching Authority corresponding to International Application No. PCT/IB2011/050502, dated Jun. 27, 2011 (7 pages).
International Written Opinion of the International Searching Authority corresponding to International Application No. PCT/IB2010/055541, dated May 26, 2011; 6 pages.
International Written Opinion, PCT/IB2012/052372, mailed Sep. 12, 2012 (6 pages).
Jafarabadiashtiani et al.: "A New Driving Method for a-Si AMOLED Displays Based on Voltage Feedback"; dated 2005 (4 pages).
Goh et al., "A New a-Si:H Thin-Film Transistor Pixel Circuit for Active-Matrix Organic Light-Emitting Diodes", IEEE Electron Device Letters, vol. 24, No. 9, Sep. 2003, pp. 583-585.
Kanicki, J., et al. "Amorphous Silicon Thin-Film Transistors Based Active-Matrix Organic Light-Emitting Displays." Asia Display: International Display Workshops, Sep. 2001 (pp. 315-318).
Karim, K. S., et al. "Amorphous Silicon Active Pixel Sensor Readout Circuit for Digital Imaging." IEEE: Transactions on Electron Devices. vol. 50, No. 1, Jan. 2003 (pp. 200-208).
Lee et al.: "Ambipolar Thin-Film Transistors Fabricated by PECVD Nanocrystalline Silicon"; dated 2006.
Lee, Wonbok: "Thermal Management in Microprocessor Chips and Dynamic Backlight Control in Liquid Crystal Displays", Ph.D. Dissertation, University of Southern California (124 pages), 2008.
Ma E Y et al.: "organic light emitting diode/thin film transistor integration for foldable displays" dated Sep. 15, 1997(4 pages).
Matsueda y et al.: "35.1: 2.5-in. AMOLED with Integrated 6-bit Gamma Compensated Digital Data Driver"; dated May 2004.
Mendes E., et al. "A High Resolution Switch-Current Memory Base Cell." IEEE: Circuits and Systems. vol. 2, Aug. 1999 (pp. 718-721).
Nathan A. et al., "Thin Film imaging technology on glass and plastic" ICM 2000, proceedings of the 12 international conference on microelectronics, dated Oct. 31, 2001 (4 pages).

(56) References Cited

OTHER PUBLICATIONS

Nathan et al., "Amorphous Silicon Thin Film Transistor Circuit Integration for Organic LED Displays on Glass and Plastic", IEEE Journal of Solid-State Circuits, vol. 39, No. 9, Sep. 2004, pp. 1477-1486.
Nathan et al.: "Backplane Requirements for active Matrix Organic Light Emitting Diode Displays,"; dated 2006 (16 pages).
Nathan et al.: "Call for papers second international workshop on compact thin-film transistor (TFT) modeling for circuit simulation"; dated Sep. 2009 (1 page).
Nathan et al.: "Driving schemes for a-Si and LTPS AMOLED displays"; dated Dec. 2005 (11 pages).
Nathan et al.: "Invited Paper: a-Si for AMOLED—Meeting the Performance and Cost Demands of Display Applications (Cell Phone to HDTV)", dated 2006 (4 pages).
Office Action in Japanese patent application No. JP2006-527247 dated Mar. 15, 2010. (8 pages).
Office Action in Japanese patent application No. JP2007-545796 dated Sep. 5, 2011. (8 pages).
Partial European Search Report mailed Mar. 20, 2012 which issued in corresponding European Patent Application No. EP 11191641.7 (8 pages).
Partial European Search Report mailed Sep. 22, 2011 corresponding to European Patent Application No. EP 11168677.0 (5 pages).
Philipp: "Charge transfer sensing" Sensor Review, vol. 19, No. 2, Dec. 31, 1999, 10 pages.
Rafati et al.: "Comparison of a 17 b multiplier in Dual-rail domino and in Dual-rail D L (D L) logic styles"; dated 2002 (4 pages).
Safavian et al.: "Three-TFT image sensor for real-time digital X-ray imaging"; dated Feb. 2, 2006 (2 pages).
Safavian et al.: "3-TFT active pixel sensor with correlated double sampling readout circuit for real-time medical x-ray imaging"; dated Jun. 2006 (4 pages).
Safavian et al.: "A novel current scaling active pixel sensor with correlated double sampling readout circuit for real time medical x-ray imaging"; dated May 2007 (7 pages).
Safavian et al.: "A novel hybrid active-passive pixel with correlated double sampling CMOS readout circuit for medical x-ray imaging"; dated May 2008 (4 pages).
Safavian et al.: "Self-compensated a-Si:H detector with current-mode readout circuit for digital X-ray fluoroscopy"; dated Aug. 2005 (4 pages).
Safavian et al.: "TFT active image sensor with current-mode readout circuit for digital x-ray fluoroscopy [5969D-82]"; dated Sep. 2005 (9 pages).
Search Report for Taiwan Invention Patent Application No. 093128894 dated May 1, 2012. (1 page).
Search Report for Taiwan Invention Patent Application No. 94144535 dated Nov. 1, 2012. (1 page).
Spindler et al., System Considerations for RGBW OLED Displays, Journal of the SID 14/1, 2006, pp. 37-48.
Stewart M. et al., "polysilicon TFT technology for active matrix oled displays" IEEE transactions on electron devices, vol. 48, No. 5, dated May 2001 (7 pages).
Vygranenko et al.: "Stability of indium-oxide thin-film transistors by reactive ion beam assisted deposition"; dated 2009.
Wang et al.: "Indium oxides by reactive ion beam assisted evaporation: From material study to device application"; dated Mar. 2009 (6 pages).
Yi He et al., "Current-Source a-Si:H Thin Film Transistor Circuit for Active-Matrix Organic Light-Emitting Displays", IEEE Electron Device Letters, vol. 21, No. 12, Dec. 2000, pp. 590-592.
Yu, Jennifer: "Improve OLED Technology for Display", Ph.D. Dissertation, Massachusetts Institute of Technology, Sep. 2008 (151 pages).
Extended European Search Report mailed Aug. 6, 2013, issued in European Patent Application No. 11739485.8 (14 pages).
International Search Report corresponding to co-pending International Patent Application Serial No. PCT/IB2013/054251, Canadian Intellectual Property Office, dated Sep. 11, 2013; (4 pages).
International Written Opinion corresponding to co-pending International Patent Application Serial No. PCT/IB2013/054251, Canadian Intellectual Property Office, dated Sep. 11, 2013; (5 pages).
Singh, et al., "Current Conveyor: Novel Universal Active Block", Samriddhi, S-JPSET vol. I, Issue 1, 2010, pp. 41-48.

* cited by examiner

CIRCUIT AND METHOD FOR DRIVING AN ARRAY OF LIGHT EMITTING PIXELS

CROSS-REFERENCE TO RELATED APPLICATION

This application is a U.S. continuation application of U.S. application Ser. No. 13/113,651, filed May 23, 2011, now allowed, which is a continuation of U.S. application Ser. No. 10/554,754, filed Oct. 28, 2005, now U.S. Pat. No. 7,978,187 B2, which is a U.S. national phase of International Application No. PCT/CA2004/001742, filed Sep. 23, 2004, which claims the benefit of priority of Canadian Patent Application No. 2,472,689, filed Jun. 29, 2004, and Canadian Patent Application No. 2,443,206, filed Sep. 23, 2003, each of which are incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF INVENTION

The present invention generally relates to a light emitting device display techniques, and more particularly, to a technique for driving light emitting elements that uses a feedback architecture during programming to compensate for instability and non-uniformity of the pixels.

BACKGROUND OF THE INVENTION

Recently active-matrix organic light-emitting diode (OLED) displays have become more attractive due to advantages over conventional liquid crystal flat displays. These advantages include the ability to fabricate OLED displays at a relatively low cost and high efficiency. Further the displays do not require backlighting and provide a wide viewing angle.

An active-matrix organic light-emitting diode (AMOLED) display compromises an array of rows and columns of pixels, each having an OLED and some active devices such as thin film transistors. Since OLEDs are current driven devices the pixel circuit of an AMOLED should be capable of providing an accurate and constant drive current to achieve a consistent and uniform luminance.

As disclosed in U.S. Pat. No. 5,748,160, a simple pixel circuit comprises two thin film transistors (TFTs) and an OLED. In this circuit, the OLED is connected to the drain terminal of a driving TFT and a gate terminal of the driving TFT is connected to a column line through a switching TFT. A storage capacitor connected between the gate terminal of the driving TFT and ground is used to maintain the voltage at the gate terminal of the driving TFT when the pixel circuit is disconnected from column line. For this circuit the current through OLED strongly depends on the characteristic parameters of the driving TFT. Since the characteristic parameters of a TFT, particularly, the threshold voltage under bias stress, vary by time, and such changes may differ from pixel to pixel, the induced image distortion may be unacceptably high.

One of the methods that has been employed to make the current driving circuit less sensitive to the shift in the threshold voltage is programming the pixel with current instead of voltage. In this method, the OLED current is less dependent on the voltage-current characteristics of driving transistors. Implementations of current programmed pixel circuits for OLEDs have been disclosed e.g. Yi HE et al. "Current Source a-Si: H Thin-Film Transistor Circuit for Active Matrix Organic Light-Emitting Displays", IEEE Electro Device Letters, Vol. 21, No. 12, p 590-592, December 2000). A drawback of the current programming method is that it is slow, particularly for low programming current levels, due to the large line capacitance. As a result, voltage programming methods are desirable considering their speed. This is particularly true for large area TVs and displays.

Another method to make the drive current less sensitive to transistor parameters is to use current feedback. United States patent application 20020101172A1 provides a driving system with current feedback. An external current comparator compares the pixel current with a reference current and generates an appropriate signal to control the pixel current. One drawback of the disclosed method is that the control signal is a current, which can limit the programming speed. Another drawback of the method is that the anode and cathode electrode of each OLED have to be patterned, which creates reliability concerns in the currently used OLED fabrication process.

Luminance feedback is another method that has been used to stabilize OLED luminance. As described in U.S. patent application 20030151569 feedback readout circuits responsive to the feedback signal representing the light output of the OLED can be used to provide brightness control. A drawback of the disclosed method is that every pixel requires a photo-sensor that is optically coupled to the OLED. This results in integration issues. Another drawback is that the low level of the feedback signal generated by a photo-sensor may lead to the poor signal-noise ratio, thereby narrowing the dynamic range of the system.

SUMMARY OF THE INVENTION

The present invention provides several driving circuits having a feedback control-system architecture that can be used for driving a column of the light emitting devices and are suitable for use in SMOLED displays. In the present invention, a feedback voltage is generated by an on-pixel feedback circuit or element. This voltage is used to adjust the programming voltage of the pixel.

According to an aspect of the invention each pixel in the column is connected to the feedback-type control unit via signal line and feedback lines, and receives a scanning clock signal via select line connection terminal. The programming voltage applied to the pixel through the signal line sets the driving current through the light emitting element. The programming voltage can be accurately adjusted by an external control unit through the use of feedback voltage generated by the on-pixel feedback circuit. The feedback voltage is proportional to the driving current of the light emitting element and is used to set the programming voltage so as to achieve the desired driving current despite presence of any instability (shift in characteristics of transistors and light emitting element) and non-uniformity across pixels The column control unit may be connected to the block of reference elements formed on the display substrate in order to correct an error in the output current level caused by inaccuracy of the pixel components or temperature drift. The block of reference elements may also include a photo-sensor optically coupled to the light emitting element in order to provide a luminance feedback compensation for brightness variations induced by instability of organic material or temperature changes.

According to another aspect of the invention a pixel circuit for use in a display is provided. The display comprising a plurality of pixels with each pixel having a select line, a signal line, a feedback line. The pixel circuit comprising a light emitting element, a drive part for providing a drive current to the light emitting element, the drive part having a storage capacitor and a switch use transistor having a gate terminal connected to the select line, and a first terminal connected to the signal line, and a second terminal, and an on-pixel feedback element for generating a feedback voltage representing a drive current provided to the light emitting element, the feedback signal being provided to the feedback line.

According to another aspect of the invention a pixel circuit for use in a display is provided. The display comprising a plurality of pixels with each pixel having a first select line, a second select line, a signal line, a feedback line. The pixel circuit comprising a light emitting element, a drive part for providing a drive current to the light emitting element, the drive part comprising a storage capacitor, a switch use transistor having a gate terminal connected to the first select line, a first terminal connected to the signal line and a second terminal, a drive use transistor having a gate terminal connected to the second terminal of the switch use transistor, a first terminal and a second terminal connected to the light emitting element, and an on-pixel feedback circuit for generating a feedback voltage representing a drive current provided to the light emitting element. The feedback circuit comprising a resistor connected between the second terminal of said drive use transistor and a potential, and a feedback transistor having a gate connected to the second select line, a first terminal connected to the first terminal of the drive use transistor and a second terminal connected to the feedback line.

According to another aspect of the invention a pixel circuit for use in a display is provided. The display comprising a plurality of pixels with each pixel having a select line, a signal line, a feedback line. The pixel circuit comprising a light emitting element, a drive part for providing a drive current to the light emitting element, the drive part comprising, a storage capacitor, a switch use transistor having a gate terminal connected to the select line, a first terminal connected to the signal line and a second terminal, a drive use transistor having a gate terminal connected to the second terminal of the switch use transistor, a first terminal and a second terminal connected to the light emitting element, and an on-pixel feedback circuit for generating a feedback voltage representing a drive current provided to the light emitting element. The feedback circuit comprising a resistor connected between the second terminal of said drive use transistor and a potential, and a feedback transistor having a gate connected to the select line, a first terminal connected to the first terminal of the drive use transistor and a second terminal connected to the feedback line.

According to another aspect of the invention a display device is provided. The display device comprising a select line, signal line to which a voltage signal in accordance with both brightness and feedback information is supplied, a feedback line to which a feedback voltage signal in accordance with current level of drive current is supplied, a plurality of pixels forming an array of pixels, each pixel of the plurality formed on a substrate at an intersecting portion of said scanning line and said signal and feedback lines, each pixel comprising a light emitting element, a current driving circuit having a storage capacitor and a switch use transistor, and a feedback circuit to provide feedback signals representing a current output of said current driving circuit, a display column control circuit for receiving input signals, adjusting the input signals using a reference circuit formed on the substrate at each column, and modifying the input signals in response to the feedback signals from pixels in the column to produce a desired brightness level of said light emitting element in a selected pixel, and a selecting line drive circuit for successively activating selecting lines.

According to another aspect of the invention a method of driving a plurality of light emitting elements arranged in a column at a desired brightness is provided. The method comprising the steps of selecting one pixel of a plurality of pixels in the column, establishing the desired brightness of a reference light emitting element by adjusting a reference current flowing through the light emitting element in response to a photocurrent from a photo-sensor that is optically coupled with the reference light emitting element, converting the reference current into a corresponding voltage level, transmitting the voltage level to the selected pixel, converting the voltage level into a drive current and generating a feedback signal representing a drive current level, adjusting the voltage level in response to the feedback signal from the selected pixel to establish a drive current substantially equal to the reference current, storing the adjusted voltage level, and driving the light emitting element with the drive current in accordance with the adjusted voltage level to produce the desired brightness level in the pixel.

Advantages of the present invention include the ability to provide a stable current to the light emitting diode over time, thereby maintaining image quality. Moreover, the combination of the external current feedback for pixel programming and luminance feedback for data signal preprocessing provides brightness control and compensation despite instability and non-uniformity in pixels. The circuits occupy a small area and are voltage programmed with voltage feedback. The use of voltage for programming and feedback improves the programming speed, which is necessary for large area displays and TVs.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The present invention encompasses a technique for driving of columns of pixels where each pixel comprises a light emitting element, in particular, an organic light emitting diode (OLED).

Figure 1:
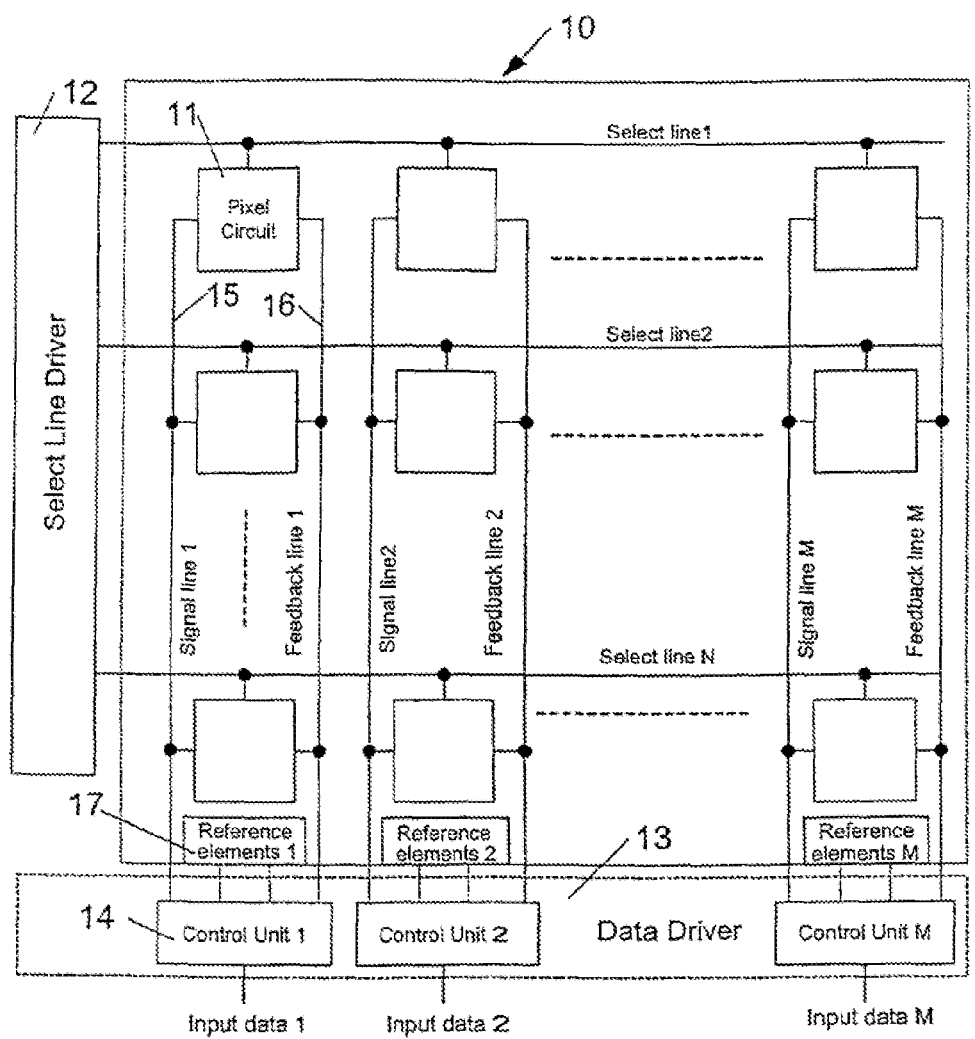
FIG. 1 is a block diagram of an example of the configuration of a display device with feedback control-system architecture according to an embodiment of the invention.

FIG. 1 presents a display device having a feedback control-system architecture 10 and an array of addressable pixels 11. The pixels 11 are controlled by a select line driver 12 and data driver 13. As shown in FIG. 1, a separate feedback control unit 14 is provided on each column line of the array. The feedback control unit 14 of a given column is connected to each pixel in the column via a signal line 15 and a feedback line 16. A block of reference elements 17, located on the display substrate, may also be provided. The block of the reference elements 17 includes some elements of the pixel circuit for input signal corrections and may also include a photo-sensor that is optically coupled to a light emitting element to implement a luminance feedback.

Figure 2:
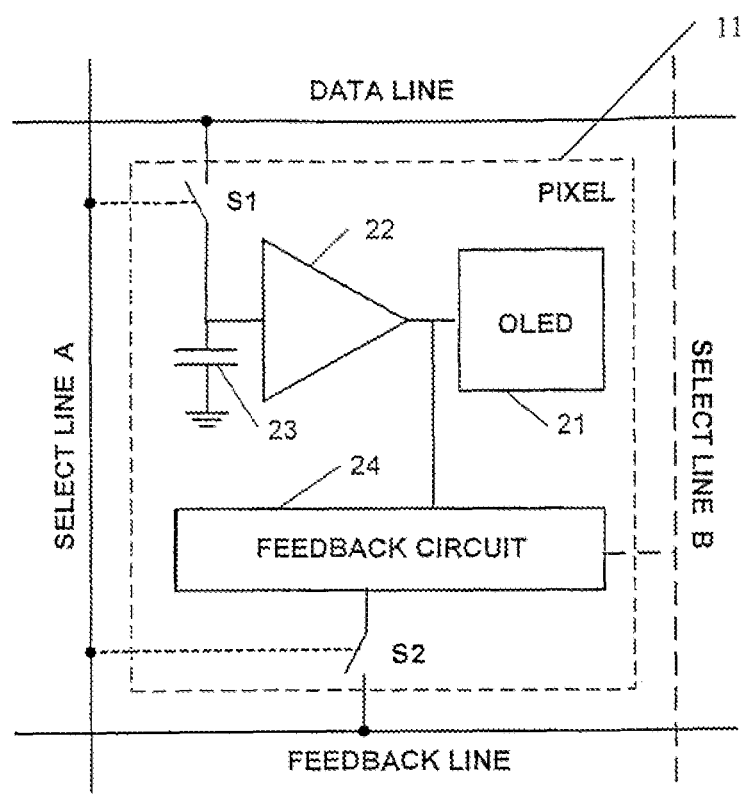
FIG. 2 is a block diagram of pixel architecture according to an embodiment of the invention.

The structure of a given pixel 11, according to an embodiment of the invention is shown in FIG. 2. As shown in FIG. 2, the pixel has an OLED 21, a current driving circuit 22, controlled by the stored voltage level using a storage capacitor 23, a feedback circuit 24, and switches S1 and S2. The switches S1 and S2 can be any suitable switching device, but are preferably an insulating gate type field effect transistor. The pixel 11 operates in writing and hold modes. In the writing mode, when select line(s) are activated, the switches S1 and S2 are turned on, and the current driving circuit 22 receives the signal voltage from control unit 14, while the on-pixel feedback circuit 24 feeds the voltage feedback signal. The driving current through the OLED 21 can thereby be accurately controlled through the use of negative feedback. In the hold mode, the switches S1 and S2 are turned off and the driving circuit 22 provides the driving current having a current level in accordance with the voltage level to the storage capacitor 23.

Figure 3A:
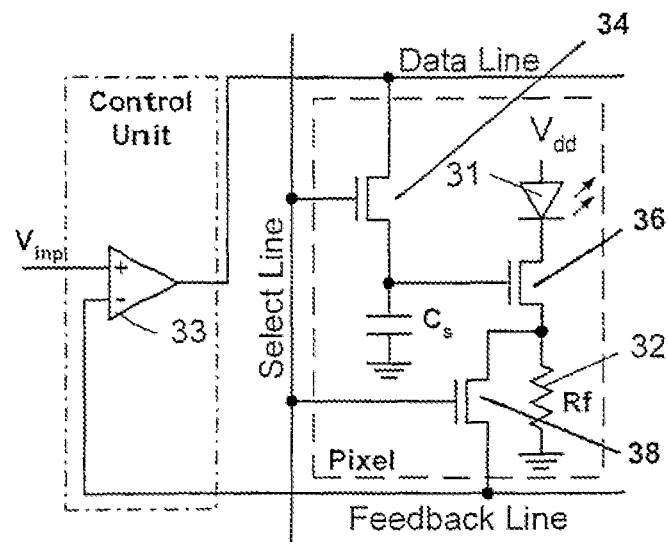
FIG. 3A is a circuit diagram of a pixel circuit and column control unit according to an embodiment of the invention.
Figure 3B:
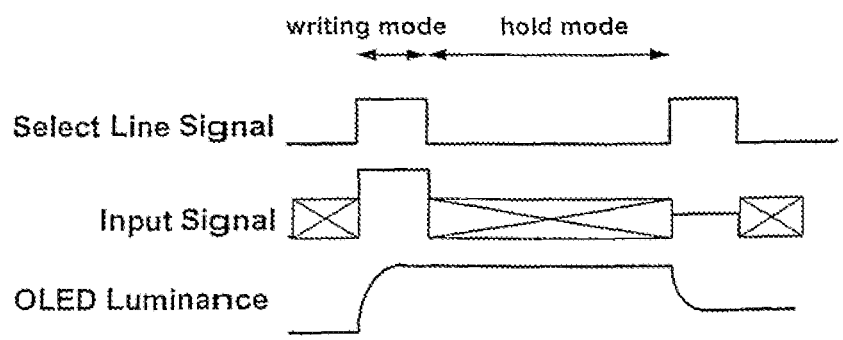
FIG. 3B depicts the corresponding waveforms for the circuit of FIG. 3A according to an embodiment of the invention.

FIG. 3A shows a pixel drive circuit according to an alternative embodiment and a circuit diagram of the control unit 14. Controlling signals are shown in FIG. 3B.

The pixel drive circuit comprises three transistors 34, 36 and 38, a resistor 32, a storage capacitor Cs and an OLED 31. The pixel drive circuit is connected to a select line, a feedback line, and a signal line. A power supply node having a positive potential Vdd and common ground are also shown.

Transistors 34, 36 and 38 can be fabricated using amorphous silicon, poly silicon, appropriate organic semiconductors and NMOS or CMOS technologies. The on-pixel feedback circuit is consisted of a thin film resistor 32 that can be fabricated with any appropriate material and technology, which provides sufficient stability. For instance, in amorphous silicon technology the resistor 32 can be fabricated using N+amorphous silicon or N+microcrystalline silicon.

The drain terminal of driving transistor 36 is connected to the cathode of OLED 31. The source terminal of transistor 36 is connected to resistor 32 and the gate terminal is connected to the signal line through transistor 34. Resistor 32 is connected between the source terminal of transistor 36 and the common ground.

Transistors 34 and 38 are driving switch and feedback switch transistors, respectively. The gate terminals of transistors 34 and 38 are connected to the select line. The source terminal of transistor 34 is connected to the signal line and the drain terminal is connected to the gate terminal of transistor 36. The source terminal of transistor 38 is connected to the feedback line and the drain terminal is connected to resistor 32. All OLEDs of the different pixels have a common anode electrode, connected to the voltage supply node (Vdd). Storage capacitor Cs is connected between the gate terminal of transistor 36 and common ground. It can be connected between gate and source terminals of transistor 36. For the latter, capacitor Cs can be implemented by the gate-source capacitance of transistor 36.

The external controlling unit 33 in its simplest form is a high-gain, low offset difference amplifier with a negative feedback connection.

During the writing mode, the select signal goes high, turning on transistors 34 and 38. As a result, the driving transistor 36, along with the external difference amplifier 33 and resistor 32 make a circuit with negative feedback. The difference in the voltage level between an input signal voltage and a voltage drop across the resistor 32 is amplified by the difference amplifier 33, adjusting the potential on the gate of transistor 36. After the initial transients the output current stabilizes and in the case of a high-gain feedback loop the current passing through the OLED 31 is:

$$I_{OLED} = \frac{Vinp}{Rf}. \quad (1)$$

During the hold mode, the select line goes low, so transistors 34 and 38 are turned off and the pixel is disconnected. Since the gate voltage of driving transistor 36 is stored in capacitor Cs, the drive current does not change during the hold mode.

Figure 4:
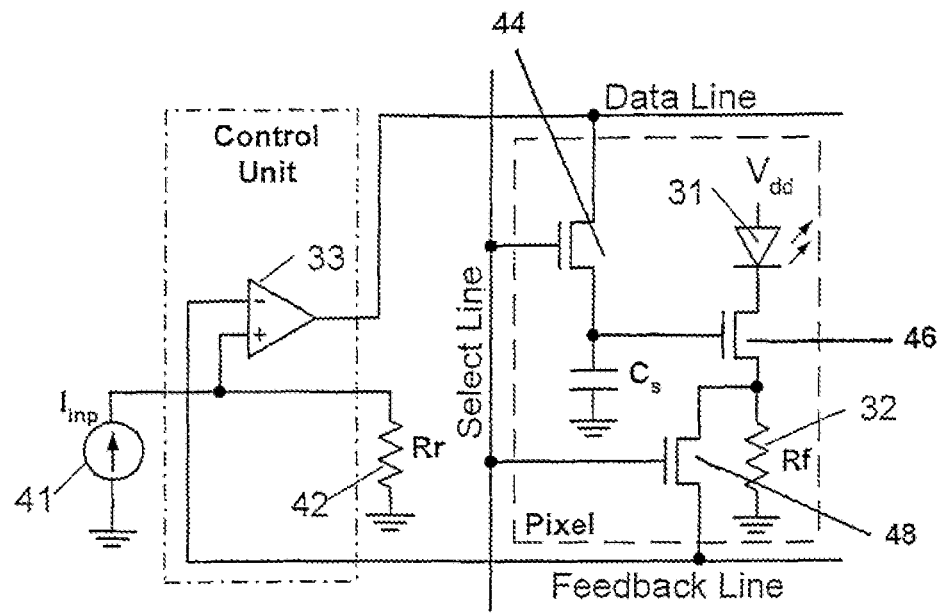
FIG. 4 is a circuit diagram of a modification. of the embodiment of FIG. 3A.

In the configuration shown in FIG. 3A, the current of the pixel 31 depends on the absolute resistance of resistor 32, which is not desirable due to possible inherent inaccuracy and poor thermal stability of integrated resistors. FIG. 4 presents an architecture, according to another embodiment of the invention that addresses this by implementing a reference resistor 42 and an external data current source 41. The reference resistor 42 is made with the same material as integrated resistors and formed on the display substrate. This enhances the temperature stability of the circuit. The programmed level of the drive current for this circuit is:

$$I_{OLED} = Iinp\frac{Rr}{Rf}, \quad (2)$$

where Rr is the resistance of the reference resistor 42, and Rf is the resistance of the feedback resistor 32. The above equation indicates a considerable improvement in the accuracy of the programming current because of insensitivity of the resistance ratio to the temperature variations.

Figure 5:
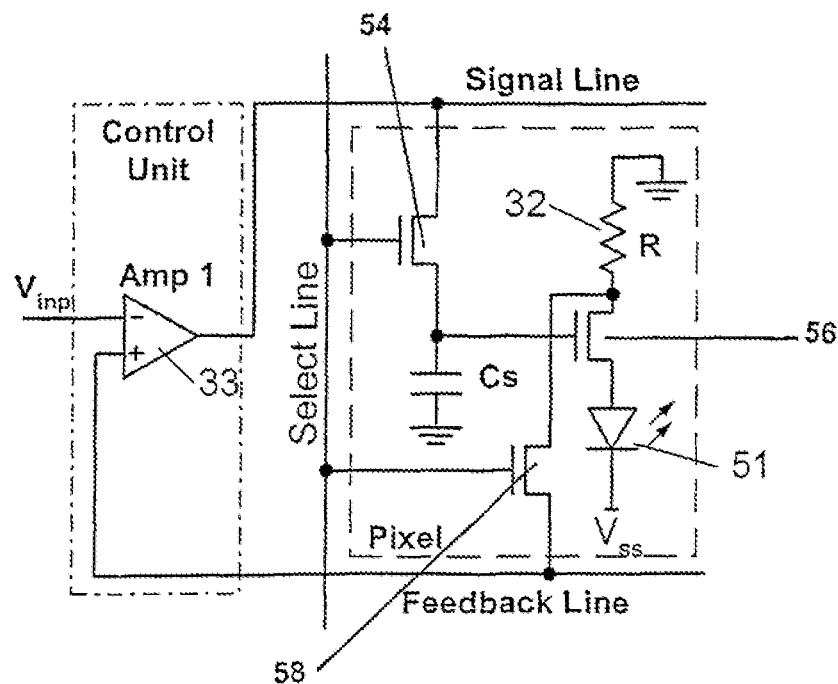
FIG. 5 is a schematic of a pixel circuit for a common cathode OLED configuration according to an embodiment of the invention.

A current pixel drive circuit according to another embodiment of the invention and a section of the column driver circuitry are shown in FIG. 5. The circuit is similar to the circuit of FIG. 3A however, in the circuit of FIG. 5, the cathode of OLED 51 is common and is connected to a negative power supply potential Vss. As a result, the cathode of the OLEDs is not patterned.

The anode of OLED 51 is connected to the source terminal of transistor 56. The feedback resistor 32 is connected between the drain terminal of transistor 56 and ground node. The voltage level of the select line during the writing mode should be high enough to guarantee that transistor 54 is in "on" state for the entire output current range. The feedback line in this configuration is connected to the non-inverting input of the difference amplifier 33 to provide a negative feedback.

Figure 6A:
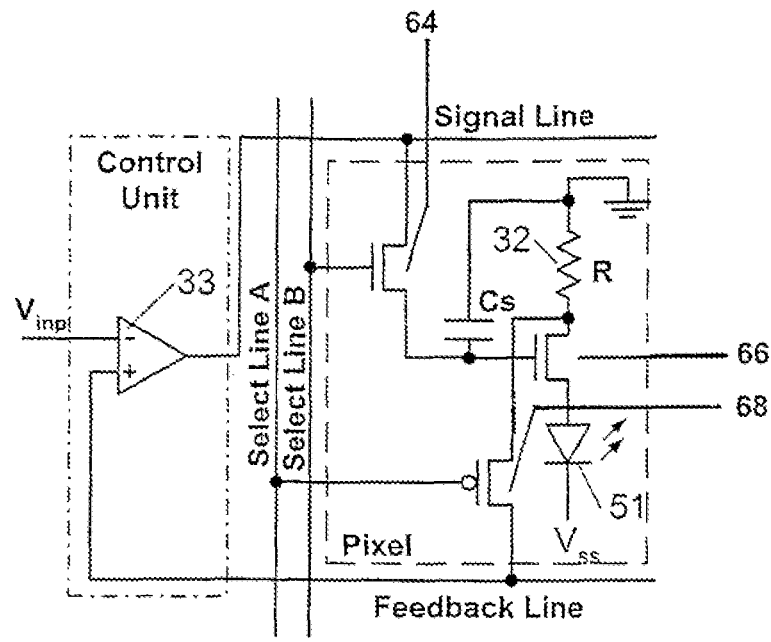
FIG. 6A is a circuit diagram of a column control unit and a pixel circuit having p-channel type transistors according to an embodiment of the invention.
Figure 7:
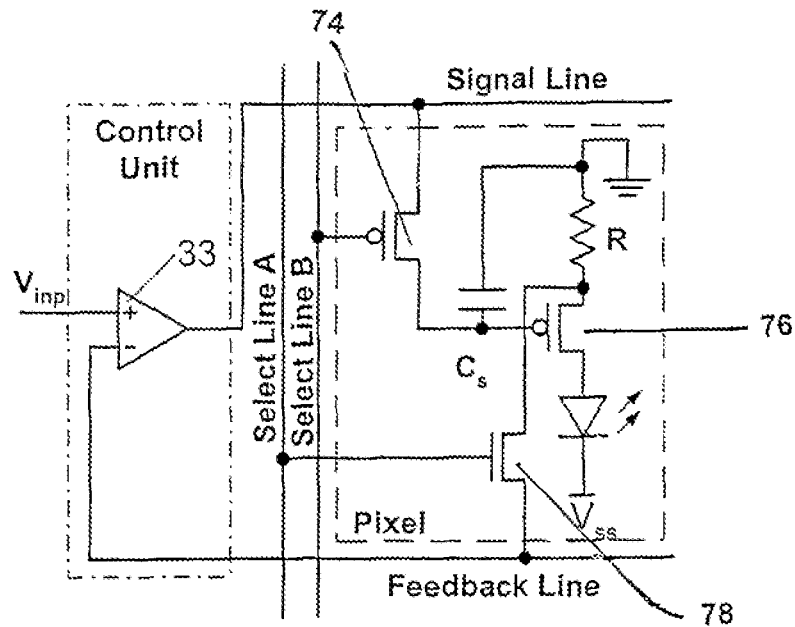
FIG. 7 is a circuit diagram of a column control unit and a pixel circuit with a p-channel type transistor switch according to an embodiment of the invention.
Figure 8:
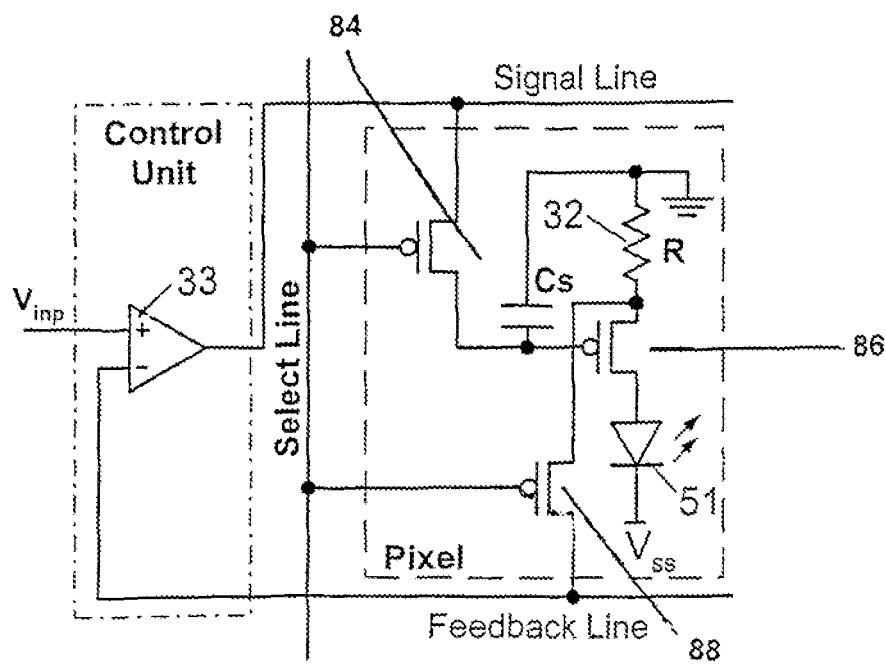
FIG. 8 is a circuit diagram of a column control unit and a pixel circuit having p-channel and n-channel type transistors according to an embodiment of the invention.

FIGS. 6A, 7 and 8 illustrate pixel drive circuit, according to other aspects of the invention wherein p-channel MOS transistors are used.

Figure 6B:
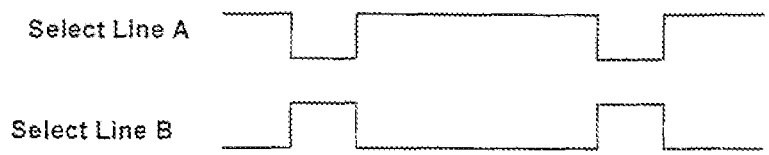
FIG. 6B depicts the corresponding waveforms for the circuit of FIG. 6A according to an embodiment of the invention.

FIG. 6A shows a pixel circuit, according to another embodiment of the invention. The feedback switch use transistor 68 is p-channel transistor. The circuit is similar to the circuit of FIG. 5, however the implementation of the PMOS transistor requires an additional select line. FIG. 6B shows corresponding waveforms for select line A and select line B. The advantage of this circuit over the circuit of FIG. 5 is the lower voltage swing for the select lines that is required.

FIG. 7 shows a pixel circuit according to another embodiment of the invention. The transistors 76 and 74 are p-channel transistors and the transistor 78 is an n-channel transistor. As an embodiment of FIG. 7 this circuit also has two select lines marked as A and B having reduced voltage swing.

In the pixel circuit shown in FIG. 8, all of the transistors are p-channel transistors. Here the anode of the OLED 51 is connected to the drain terminal of the transistor 76 and the common cathode electrode of the OLED 51 is connected to the negative power supply potential Vss.

Figure 9:
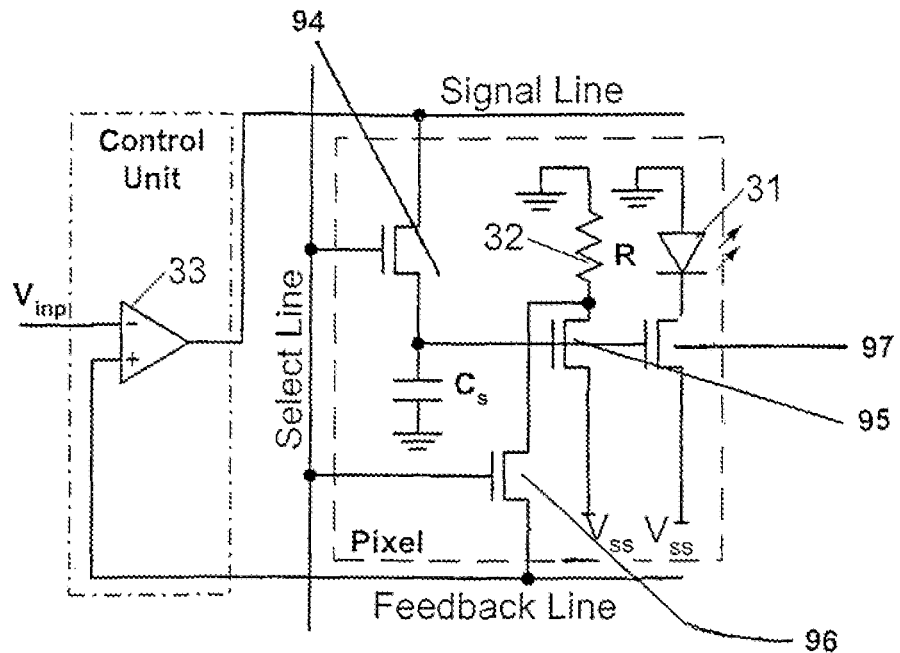
FIG. 9 is a circuit diagram of a column control unit and a pixel circuit with a current mirror as current driving circuit according to an embodiment of the invention.
Figure 10:
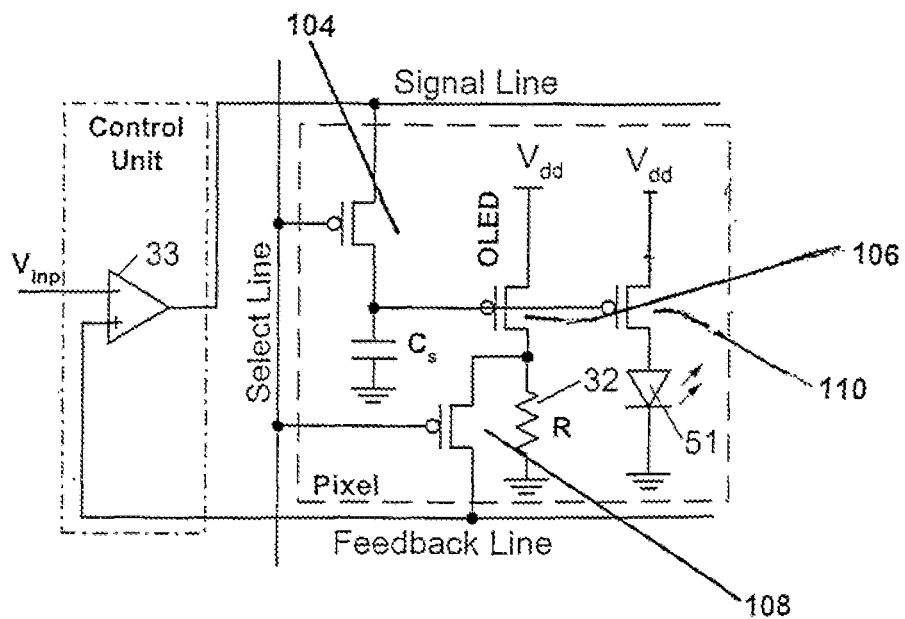
FIG. 10 is a circuit diagram of a modification of the embodiment of FIG. 9.

FIGS. 9 and 10 show configurations of the pixel circuits according to alternative embodiments of the invention. In these pixel circuits, the current driving circuitry is based on a current mirror architecture, i.e. transistors 96 and 97 and 108 and 110. The current level of the signal current and the current level of the drive current are proportional. In the circuit of FIG. 9, all transistors are n-channel transistors and in the circuit of FIG. 10 all transistors are p-channel transistors.

In FIG. 10, the feedback resistor 32 is connected between the drain terminal of transistor 106 and common ground. The gate terminals of the transistors 106 and 110 are connected. In the circuit of FIG. 9, the cathode electrode of OLED 31 is connected to the drain terminal of transistor 97, the anode is common and the transistor 97 is the driving transistor and is connected to OLED 31. In the circuit of FIG. 10, the cathode of the OLED 51 is common and the anode is connected to the drain terminal of the transistor 110.

During writing mode, the transistors 104 and 108 are in an "on" state, thus the transistor 106 along with feedback resistor 32 and external control unit (the difference amplifier 33) form a feedback loop. The transistor 110 does not directly take part in the feedback loop, but since the transistors 110 and 106 have same gate-source voltage, the current of the transistor 110 is proportional to the current of the transistor 106. The ratio of current through transistors 110 to 106 is determined by the aspect ratios of these transistors. In these circuits, the feedback resistor 32 and the OLED 31 of FIGS. 9 and 51 of FIG. 10, are not in the same current path thus a higher lifetime is expected.

Figure 11:
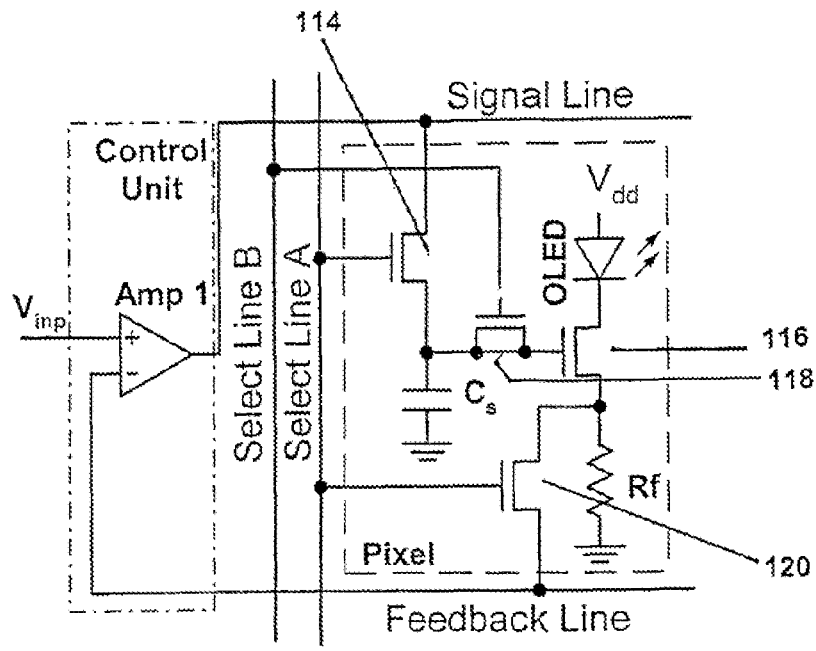
FIG. 11 is a circuit diagram of a modification of the embodiment of FIG. 3.

Several methods have been used to reduce the charge injection and clock feed-through effects in integrated circuits. As the simplest approach, a dummy transistor that is driven by the inverse signal of the select line connected to the gate of driving transistor can reduce both charge injection and clock feed-through errors caused by the driving switch. The drain and source terminals of the dummy transistor are connected to the gate of the driving transistor. FIG. 11 shows an example of such modification for the embodiment of FIG. 3. The width of dummy transistor 118 is half of the width of driving transistor 116. It will be apparent to one skilled in the art that the width of the dummy transistor 118 can be any appropriate size.

Figure 12:
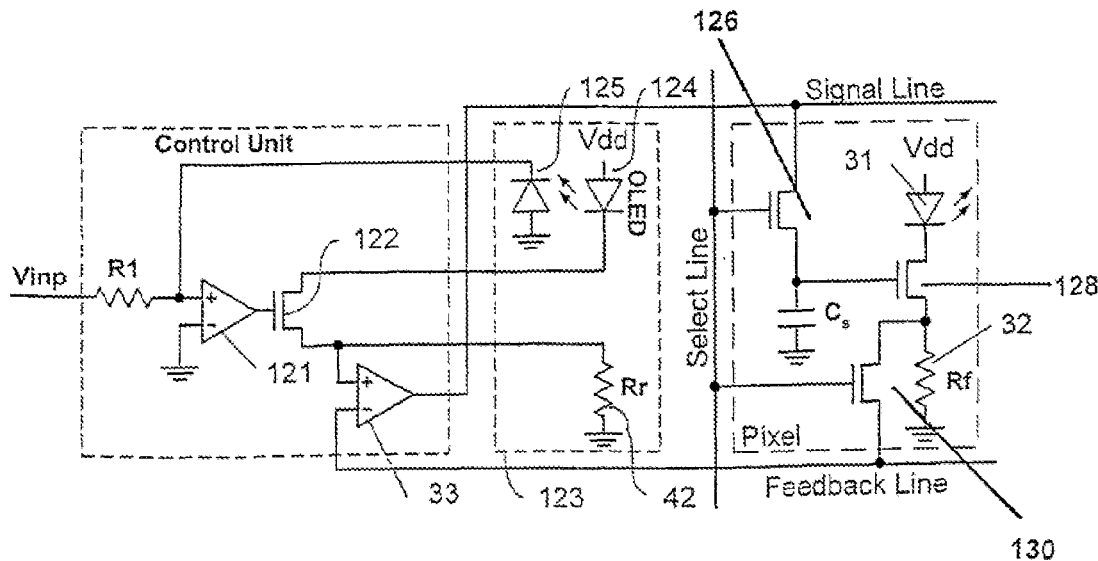
FIG. 12 is a circuit diagram of a pixel circuit, column control unit and a reference cell with implemented luminance feedback according to an embodiment of the invention.

FIG. 12 is a schematic circuit diagram of another embodiment of a pixel circuit, column control unit and a reference cell according to the present invention. Here, the implemented luminance feedback improves the linearity of the video signal-light output characteristics, and also provides a compensation for brightness instability caused by instability of the organic material, ageing, temperature changes, or other environment stresses. The compensating circuit with luminance feedback includes a resistor R1, a difference amplifier 121, and a NMOS transistor 122, which are parts of the control unit, and the elements of the reference cell 123 including an OLED 124, and photodiode 125. The photodiode 125 is optically coupled to the reference OLED 124 to form a feedback current signal in response to emitted light. The circuit is balanced when the input current passing through the resistor R1 is equal to a feedback current generated by the photodiode 125. The current flowing through OLED 124 via transistor 122 and resistor 42 is an input signal for next stage of the device, which is the same as the embodiment of FIG. 4.

Figure 13:
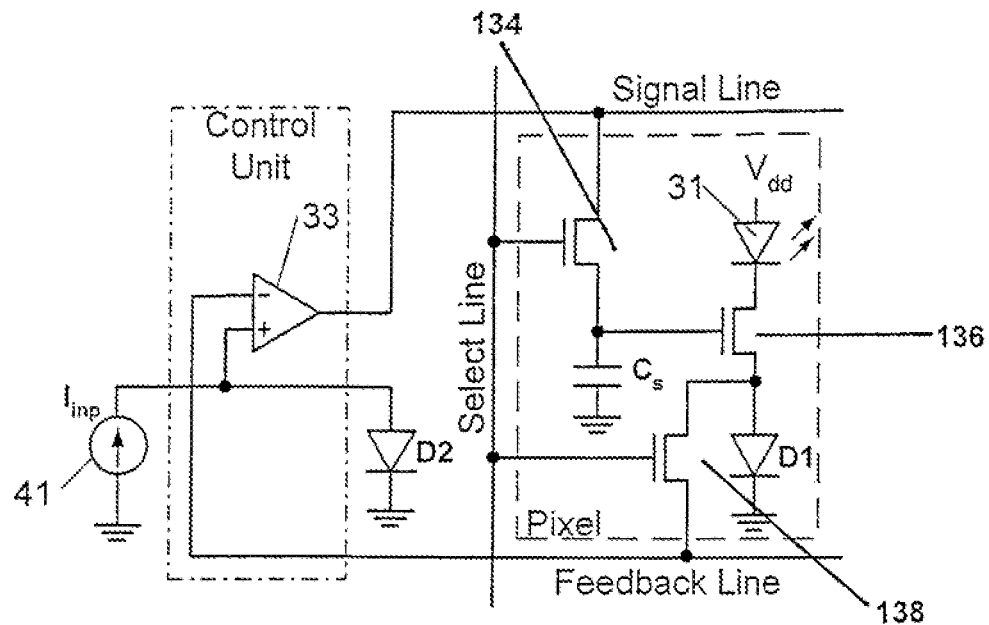
FIG. 13 is a circuit diagram of a pixel circuit and column control unit with a reference diode according to an embodiment of the invention.

FIG. 13 is a schematic diagram of an alternative embodiment of the embodiment of FIG. 4. In this embodiment, diodes D1 and D2 are used in place of feedback resistor RI and reference resistor R2 of FIG. 3, respectively. As circuit functionality with reasonably low error in the programmed current level requires a good match between the reference diode and pixel diodes, the fabrication technology must be efficient for fabrication of the diode array with reproducible forward current-voltage characteristics.

Figure 14:
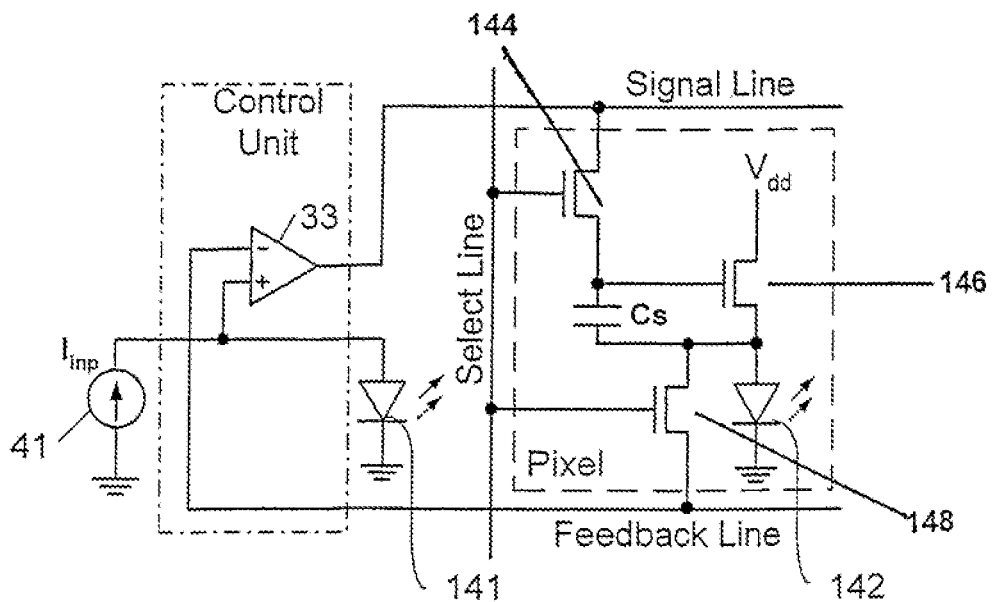
FIG. 14 is a circuit diagram of a pixel circuit, column control unit with a reference OLED according to an embodiment of the invention.
Figure 15:
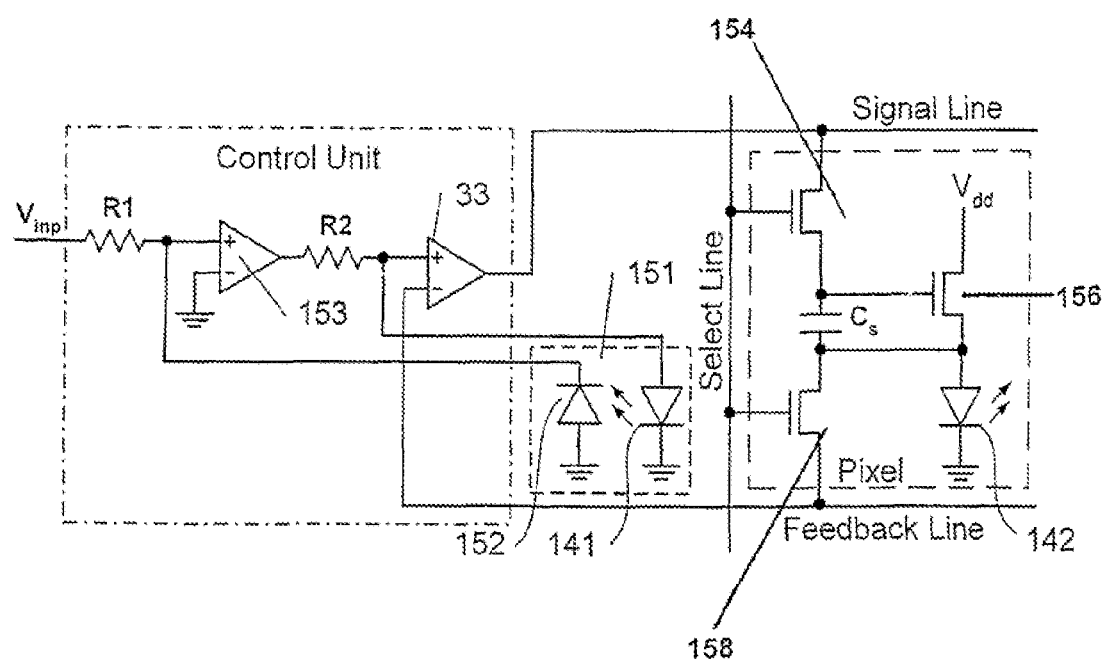
FIG. 15 is a circuit diagram of a modification of the embodiment of FIG. 14.

A schematic diagram of a circuit according to another embodiment of the invention is shown in FIG. 14. This circuit implements a common cathode OLED array configurations. In the writing mode, the input current from an external current data source 41 creates a voltage drop across a reference OLED 141. A difference amplifier 33 in negative feedback connection is designed to hold the same voltage level on a pixel OLED 142. During the hold mode, the current with a programmed current level flows through both the transistor 146 and the OLED 142 due to the voltage stored across the capacitor Cs.

Although the exemplary embodiments of the present invention are described in conjunctions with OLEDs, it is also contemplated other similar display elements such as a light emitting diode (LED) could be used in other embodiments.

The present invention has been described with regard to one or more embodiments. However, it will be apparent to persons skilled in the art that a number of variations and modifications can be made without departing from the scope of the invention as defined in the claims.

What is claimed is:

1. A pixel circuit for use in a display, the display comprising a plurality of pixels with each pixel having a select line, a signal line, and a feedback line, each of the pixels comprising:
 a light emitting element;
 a drive part for providing a drive current to the light emitting element, the drive part having a storage capacitor, a switch use transistor, a drive use transistor, and a feedback transistor; and
 an on-pixel feedback conductive path between the drive use transistor and a reference potential for generating a feedback voltage representing a drive current provided to the light emitting element, the feedback voltage being provided to the feedback line via the feedback transistor; and
 a reference circuit providing reference signals to the on-pixel feedback conductive path for improving the light output characteristics and compensating for different factors that can cause instability or non-uniformity.

2. The pixel circuit according to claim 1, wherein the switch use transistor includes a gate terminal connected to the select line, and a first terminal connected to the signal line, and a second terminal connected to the storage capacitor, and the drive use transistor includes a gate terminal connected to the second terminal of the switch use transistor, a first terminal connected to the light emitting element, and a second terminal, and the feedback switch includes a first terminal connected to the drive use transistor, and a second terminal connected to the feedback line.

3. The pixel circuit according to claim 1, wherein the reference circuit includes a feedback circuit that provides the on-pixel feedback conductive path, the feedback circuit including a resistor, a diode, or the light emitting element connected between the drive use transistor and the reference potential, the reference potential being ground.

4. The pixel circuit according to claim 3, wherein the feedback circuit comprises a resistor connected between the second terminal of said drive use transistor and a potential providing the feedback voltage at a level proportional to the drive current.

5. The pixel circuit according to claim 1, wherein the storage capacitor is connected to ground or to the first terminal of the feedback switch.

6. The pixel circuit according to claim 1, wherein the drive part further comprises:
 a second drive use transistor having a gate terminal, a first terminal and a second terminal,
 the feedback switch and the drive use transistor arranged to form a current mirror structure,
 the gate terminals of the drive use transistor and the second drive use transistor connected to the second terminal of the switch use transistor,
 the first terminal of the feedback switch and the first terminal of the second drive use transistor connected to a power supply node.

7. The pixel circuit according to claim 1, wherein each of the pixels further comprises
 a resistor connected to the second terminal of the drive use transistor, wherein the reference potential is ground.

8. The pixel circuit according to claim 1, wherein the drive part further comprises
 a second drive use transistor having a gate terminal, a first terminal and a second terminal,
 the drive use transistor and the second drive use transistor being arranged to form a current mirror structure,
 the gate terminals of the drive use transistor and the second drive use transistor being connected to the second terminal of the switch use transistor,
 the second terminal of the drive use transistor is connected to ground.

9. The pixel circuit according to claim 1, wherein the on-pixel feedback conductive path includes the light emitting element connected between the second terminal of the drive use transistor and the reference potential.

10. The pixel circuit according to claim 1, wherein each of the pixels further comprise a diode connected between the second terminal of said drive use transistor and a predetermined potential to provide the feedback voltage, and wherein said feedback switch is an insulating gate type field effect transistor having a gate connected to said select line.

11. The pixel circuit according to claim 1, wherein each pixel further includes a second select line, and wherein the feedback switch has a gate terminal connected to the second select line.

12. The pixel circuit according to claim 1, wherein said light emitting element is an organic light emitting diode.

13. The pixel circuits according to claim 1, wherein the transistors are insulating gate type field effect transistors, and wherein the insulating gate type field effect transistors comprise n-channel and p-channel type transistors.

14. The pixel circuit according to claim 1, wherein the reference circuit includes a feedback resistor to provide the feedback voltage having a level proportional to the drive current, the reference circuit further including a reference resistor coupled to a data current source external to the pixels and made from the same material as the feedback resistor.

15. The pixel circuit according to claim 1, wherein the different factors include any two or more of an instability of the pixel circuit, a shift in a characteristic of the drive use transistor, a shift in a characteristic of the light emitting element, non-uniformity of the pixel circuit relative to another pixel circuit on the display, inaccuracy of components of the pixel circuit, temperature drift, error in an drive current level for driving the light emitting element, temperature changes, an instability of organic material of the pixel circuit, instability in luminance of the light emitting device, environment stress, or aging.

16. The pixel circuit according to claim 1, wherein the reference circuit includes a reference diode used as a reference element, or a photo-diode, or a resistor, and wherein the transistors are insulating gate type field effect transistors.

17. The pixel circuit according to claim 1, further comprising a control unit having a module modifying the feedback signal from the pixel circuit based on the reference signals provided by the reference circuit.

18. A pixel circuit for use in a display, the display comprising a plurality of pixels each pixel connected to a select line, a signal line, and a feedback line, each of the pixels comprising:
 a light emitting element;
 a drive part for providing a drive current to the light emitting element, the drive part including:
  a storage capacitor;
  a switch use transistor;
  a drive use transistor connected to the light emitting element;
  an on-pixel feedback circuit for generating a feedback voltage representing a drive current provided to the light emitting element;

a feedback transistor having a gate connected to the select line, a first terminal connected to the drive use transistor and a second terminal connected to the feedback line; and a reference circuit providing reference signals to the on-pixel feedback conductive path for improving the light output characteristics and compensating for different factors that can cause instability or non-uniformity.

19. The pixel circuit according to claim 18, wherein the switch use transistor includes a gate terminal connected to the select line, a first terminal connected to the signal line and a second terminal, the drive use transistor includes a gate terminal connected to the second terminal of the switch use transistor, a first terminal and a second terminal connected to the light emitting element, and the on-pixel feedback circuit includes a resistor connected between the first terminal of said drive use transistor and a potential.

20. The pixel circuit according to claim 18, wherein the switch use transistor, drive use transistor, and the feedback transistor are p-type, and wherein the storage capacitor is connected between the gate of the drive use transistor and the potential.

21. The pixel circuit according to claim 18, the reference circuit including a photo-sensor optically coupled to a reference light emitting element such that a photocurrent level generated by the photo-sensor is compared with an input current level for adjusting a current through the reference light emitting element to form a luminance feedback.

22. The pixel circuit according to claim 18, wherein the reference cell includes a difference amplifier having an output connected to the signal line, a non-inverting input connected to the feedback line, and an inverting input connected to a reference OLED such that the OLED and the light emitting element form a common cathode OLED array configuration.

23. A method of compensating for pixel instability or non-uniformity in a display having an array of pixel circuits, the method comprising:

providing to a pixel circuit a signal voltage from a control unit external to the pixel circuit to cause a light emitting device of the pixel circuit to turn on;

generating, by an on-pixel feedback circuit that is part of the pixel circuit, a feedback voltage that is representative of a drive current provided to the light emitting device;

providing reference signals on a conductive path from the on-pixel feedback circuit for improving light output characteristics of the pixel circuit and compensating for different factors that can cause instability or non-uniformity based at least in part on the feedback voltage; and driving the light emitting device according to a drive current based on the signal voltage and the feedback voltage.

* * * * *